Dec. 30, 1958     E. A. VERRINDER ET AL     2,866,535
MACHINE FOR NAILING LIDS ON BOXES
Original Filed Sept. 10, 1952     25 Sheets-Sheet 4
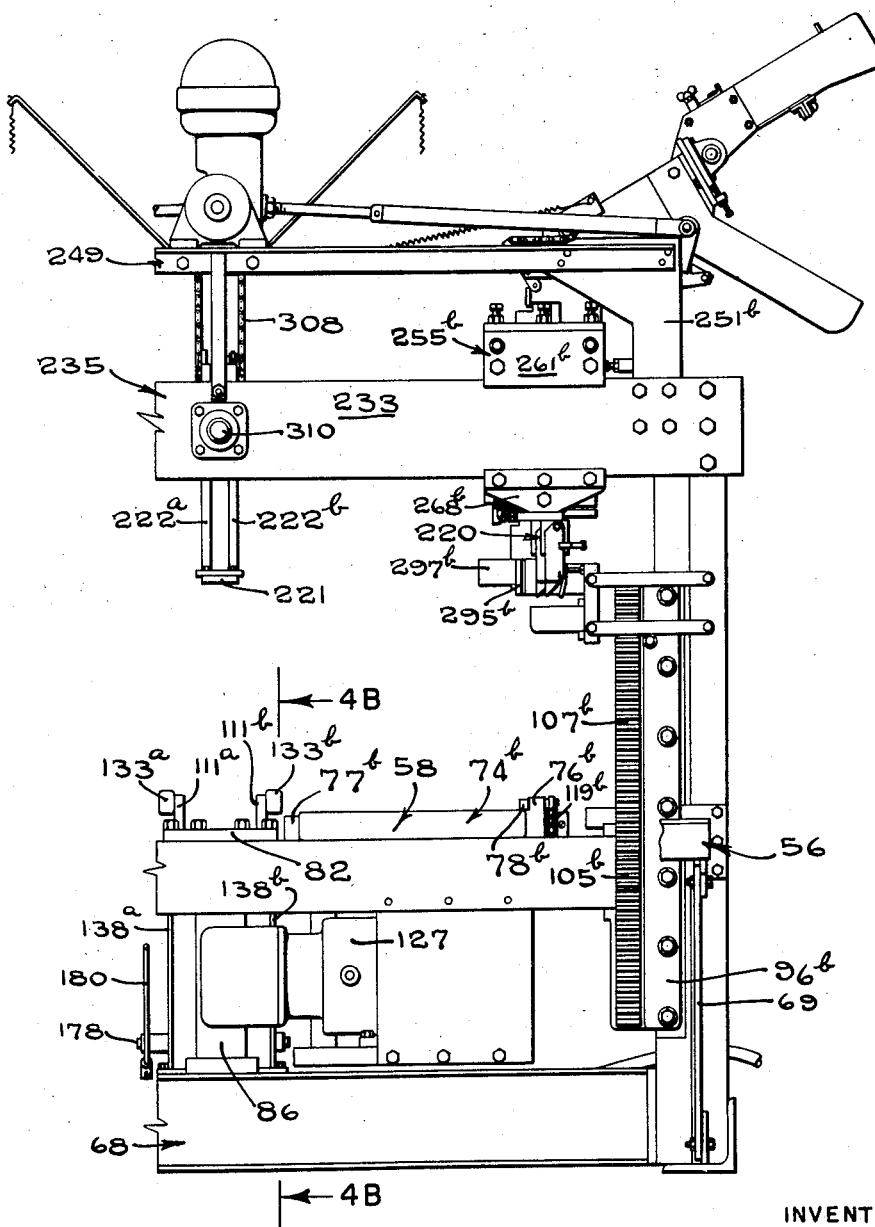
FIG_3B
INVENTORS
ERNEST A. VERRINDER
JOHN R. RICHARDS
BY *Hans G. Hoffmeister*
ATTORNEY

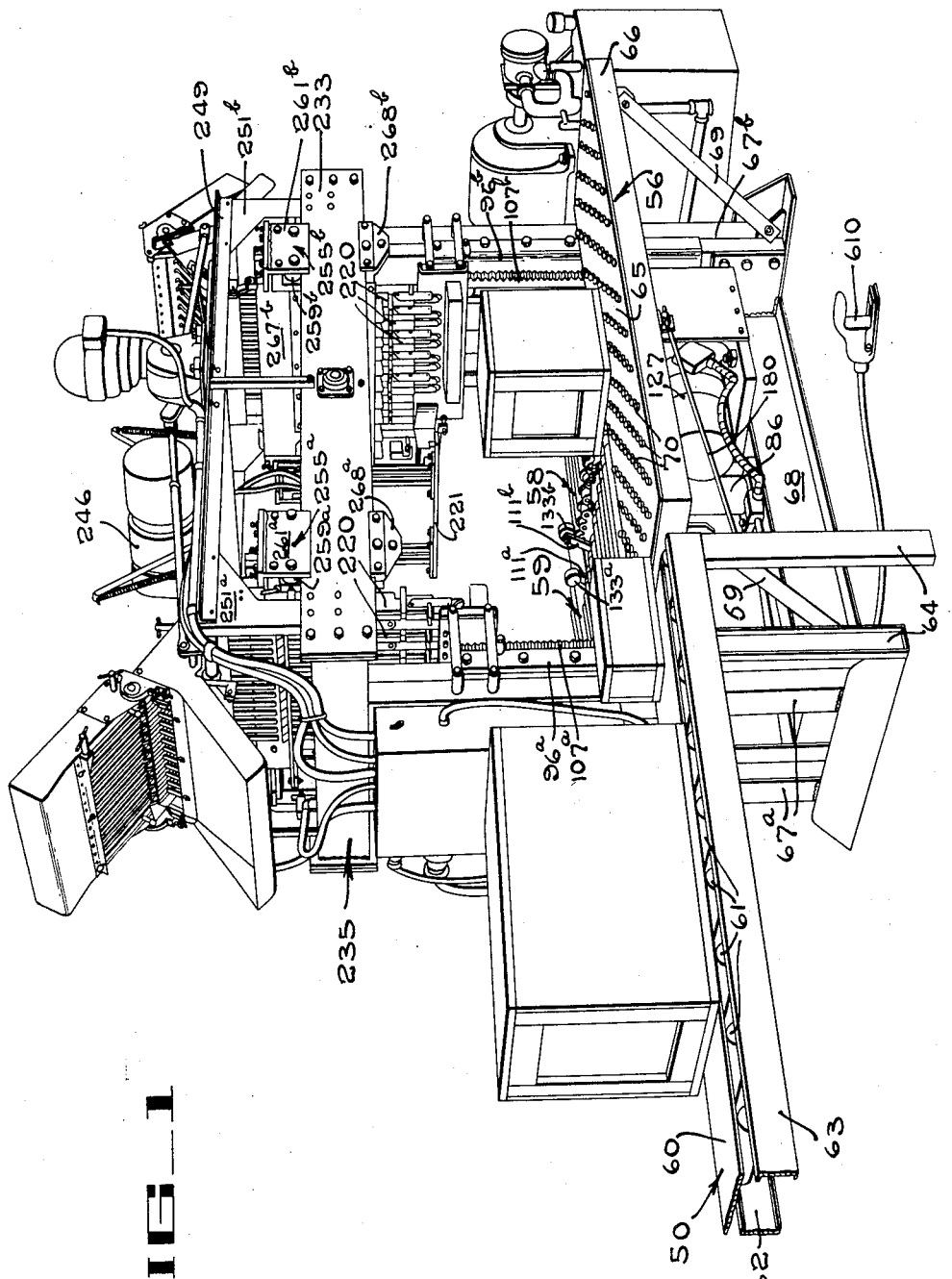

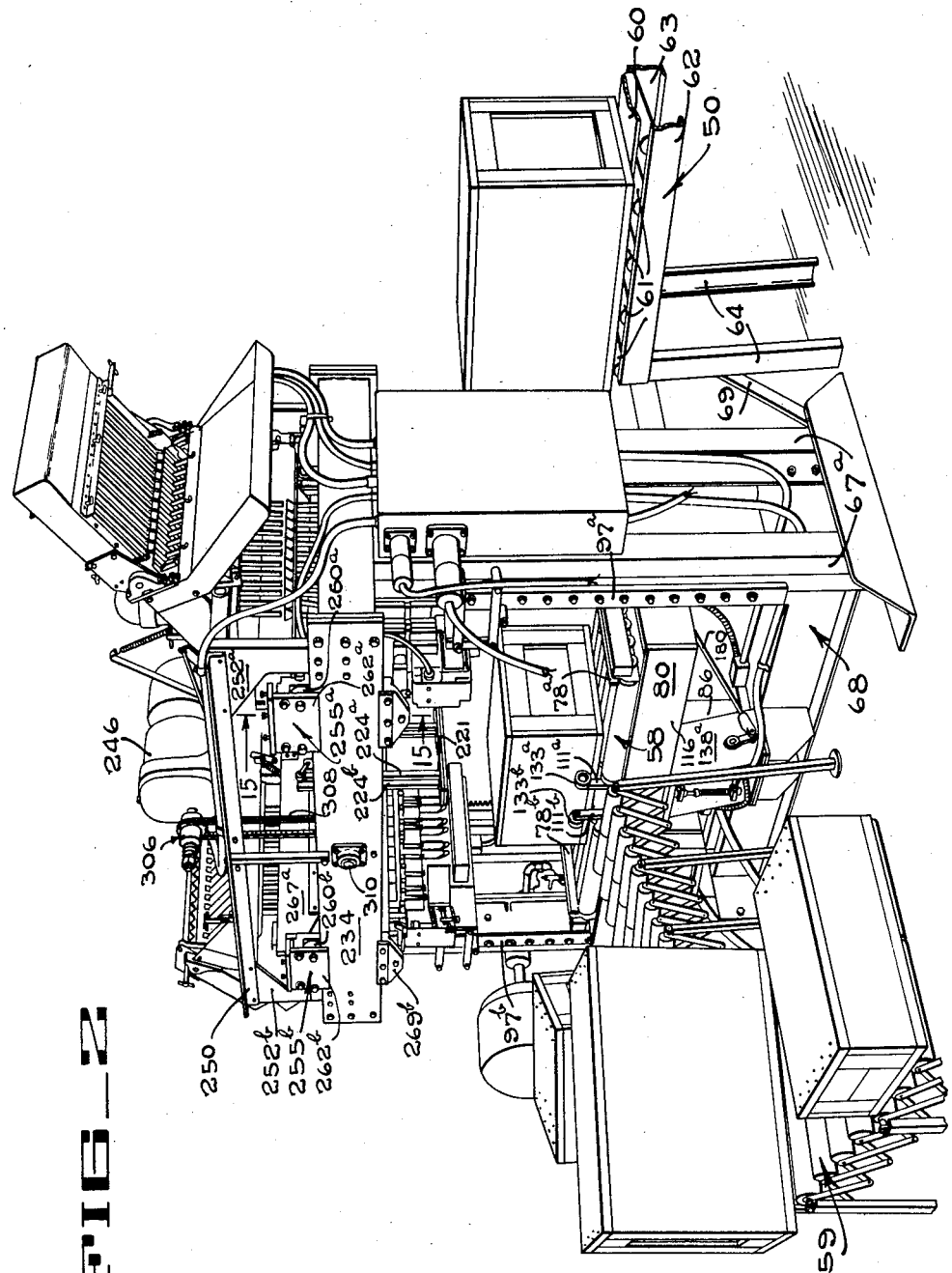
FIG_2

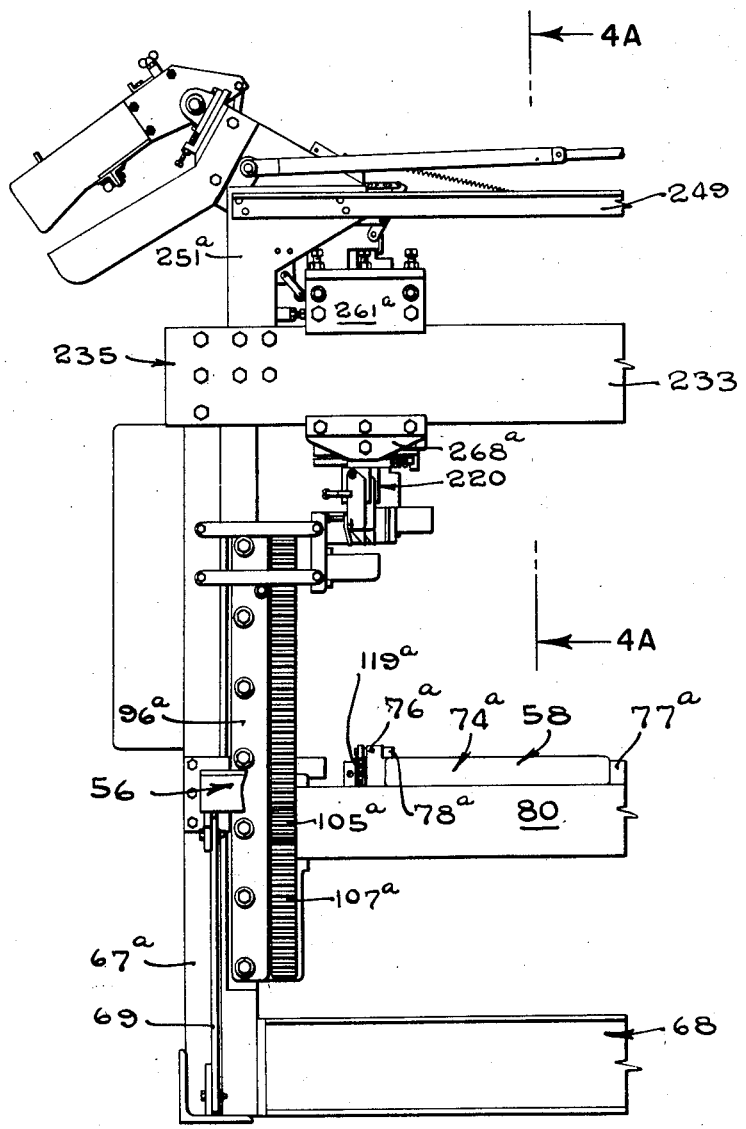

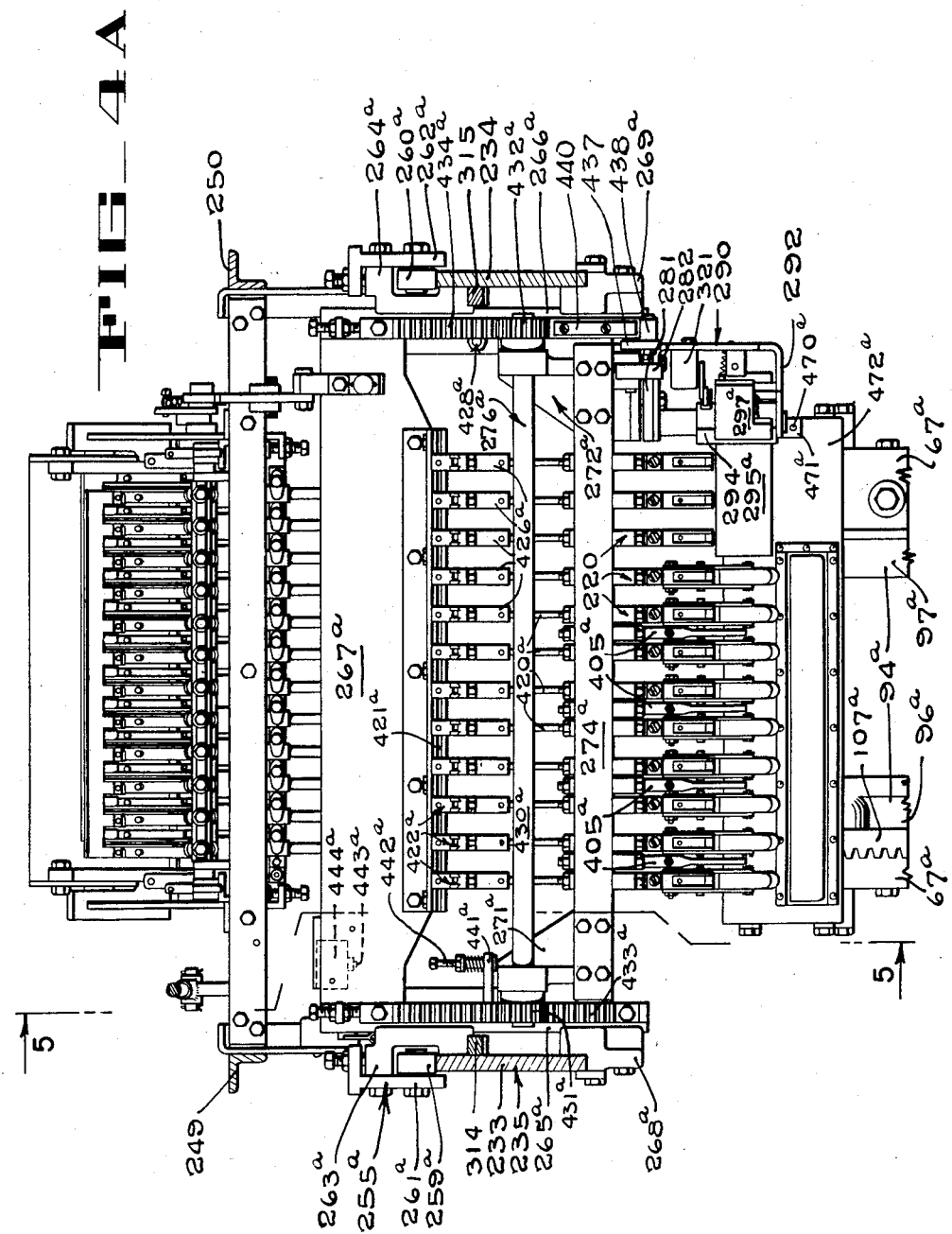

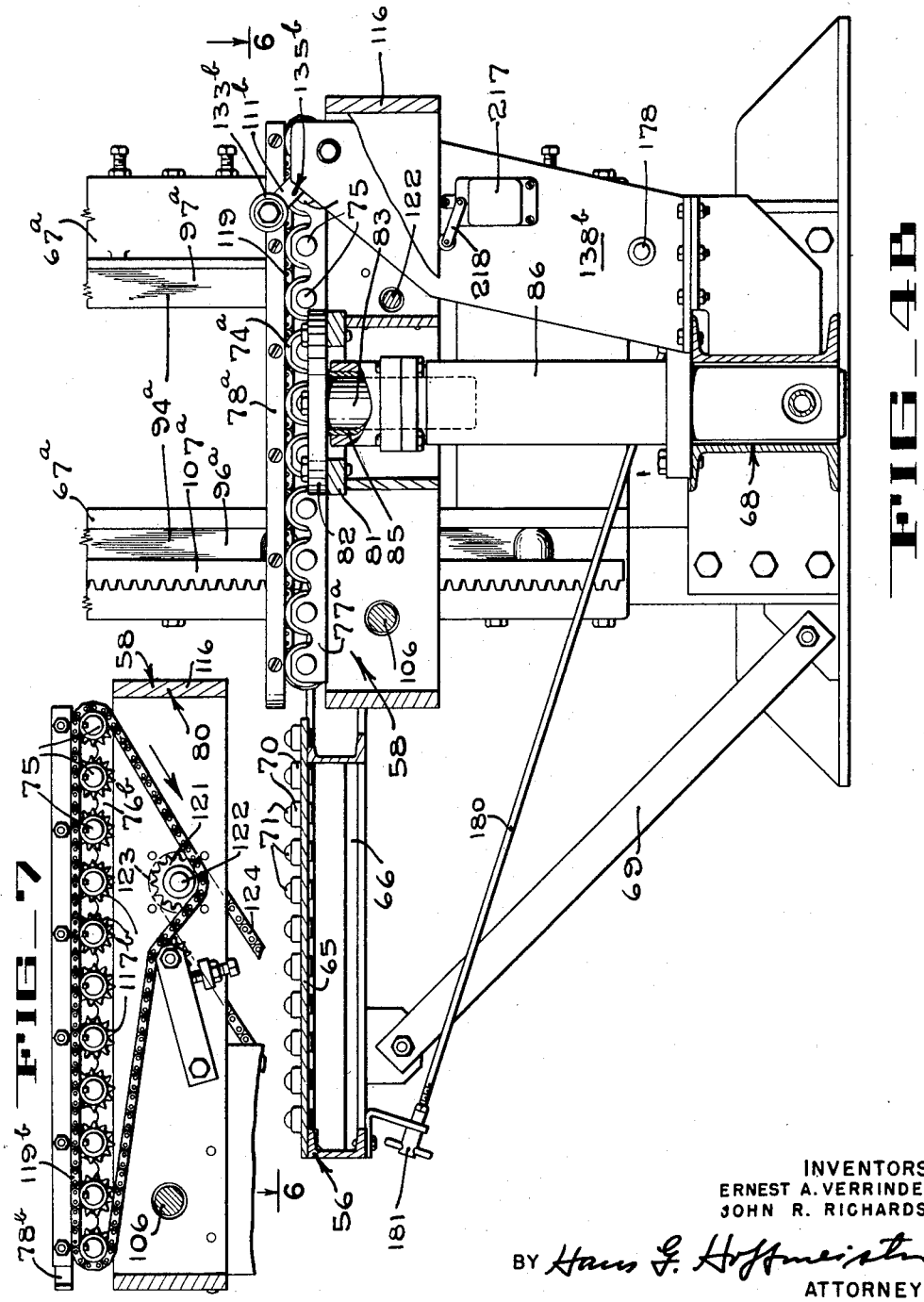

Dec. 30, 1958    E. A. VERRINDER ET AL    2,866,535
MACHINE FOR NAILING LIDS ON BOXES
Original Filed Sept. 10, 1952    25 Sheets-Sheet 7
FIG_5A
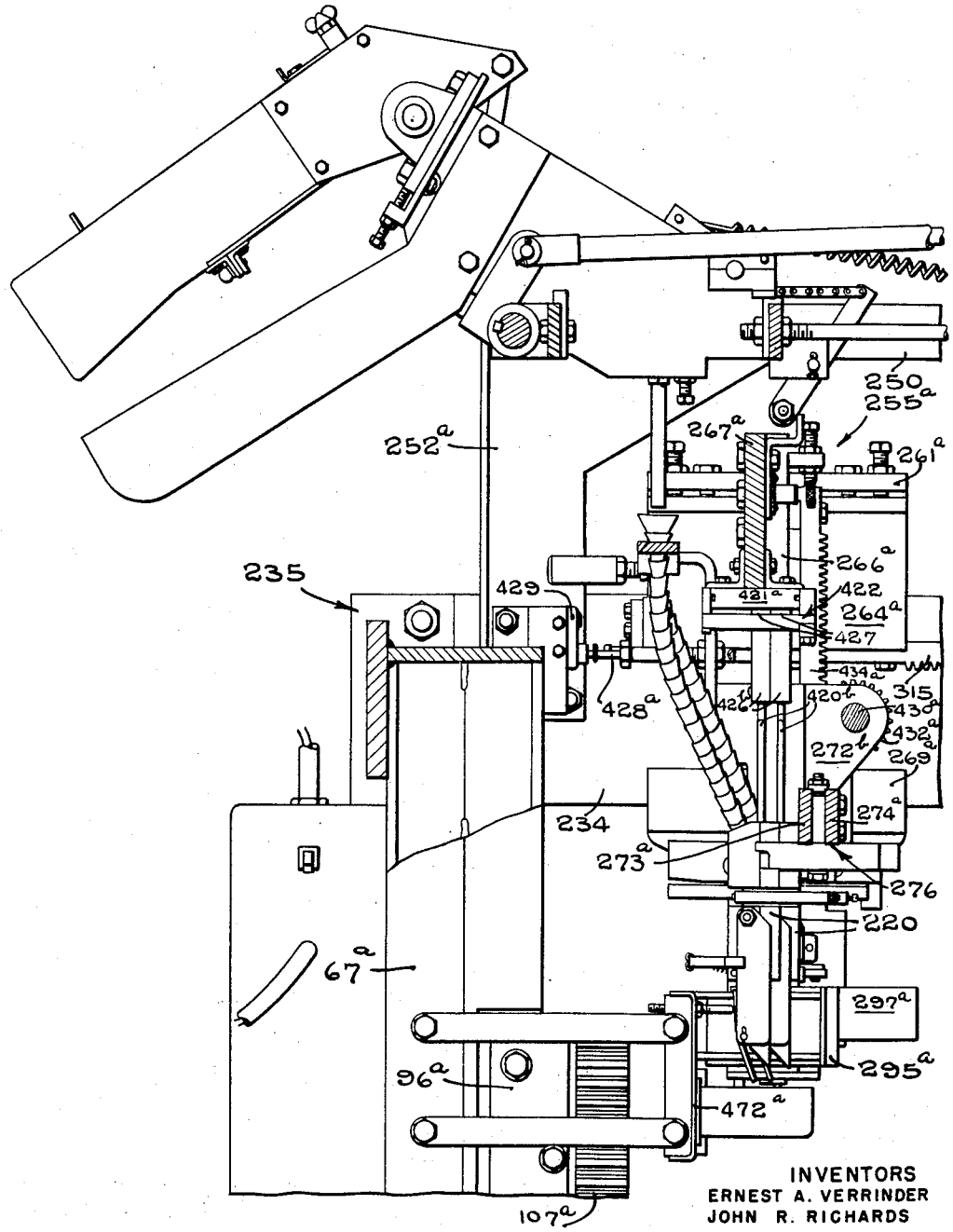
INVENTORS
ERNEST A. VERRINDER
JOHN R. RICHARDS
BY Hans G. Hoffmeister
ATTORNEY

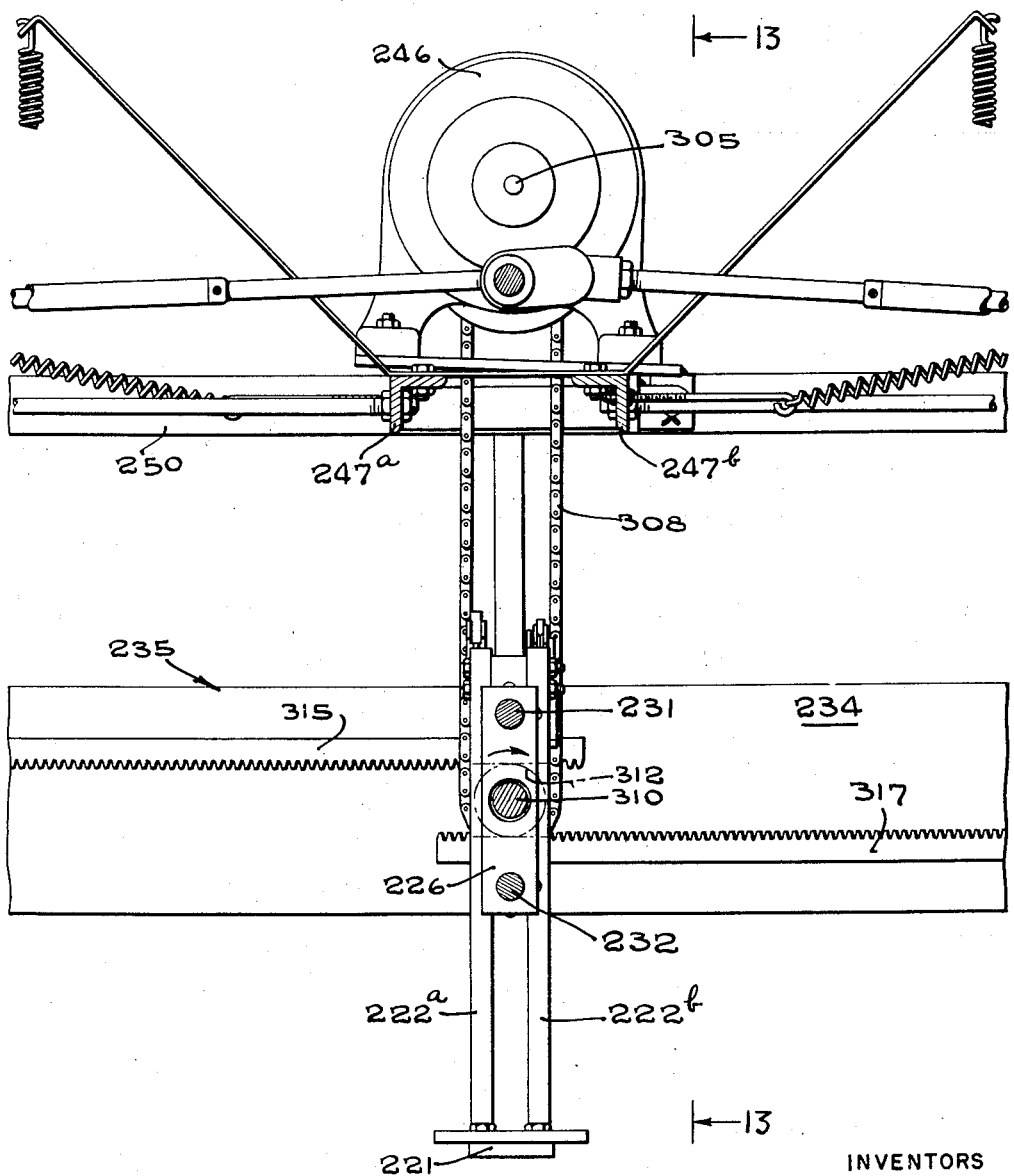

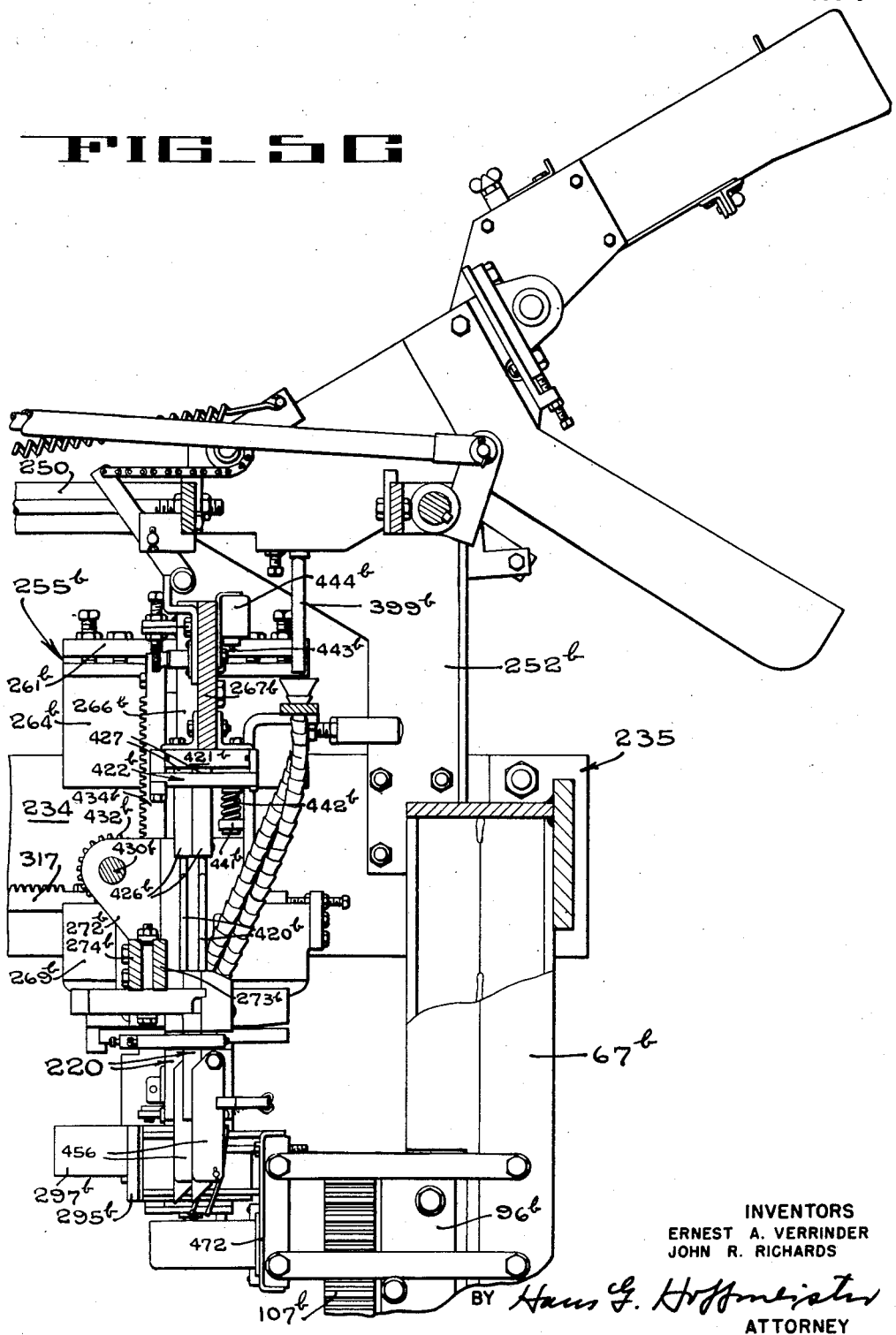

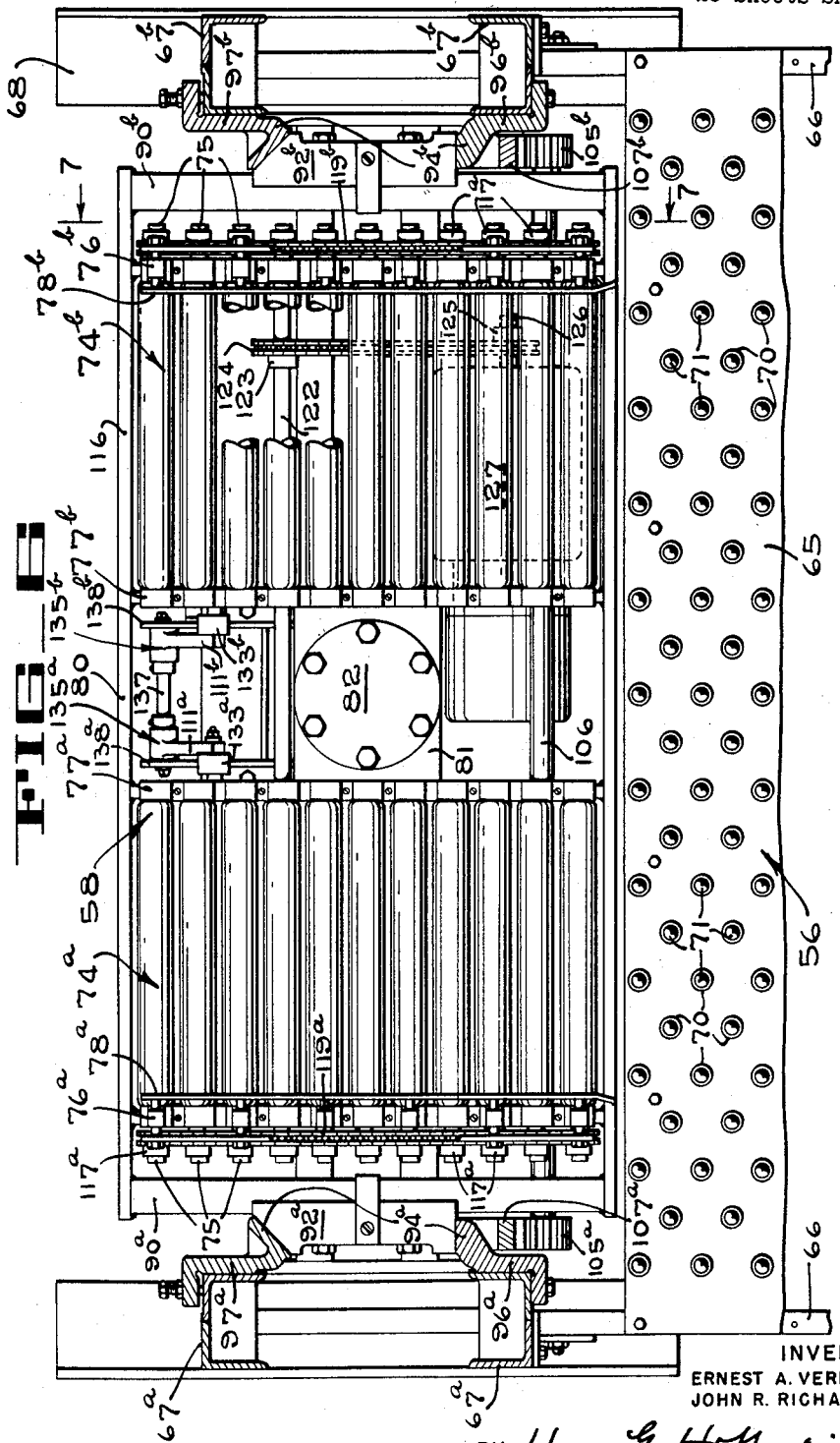

Dec. 30, 1958  E. A. VERRINDER ET AL  2,866,535
MACHINE FOR NAILING LIDS ON BOXES
Original Filed Sept. 10, 1952  25 Sheets-Sheet 11
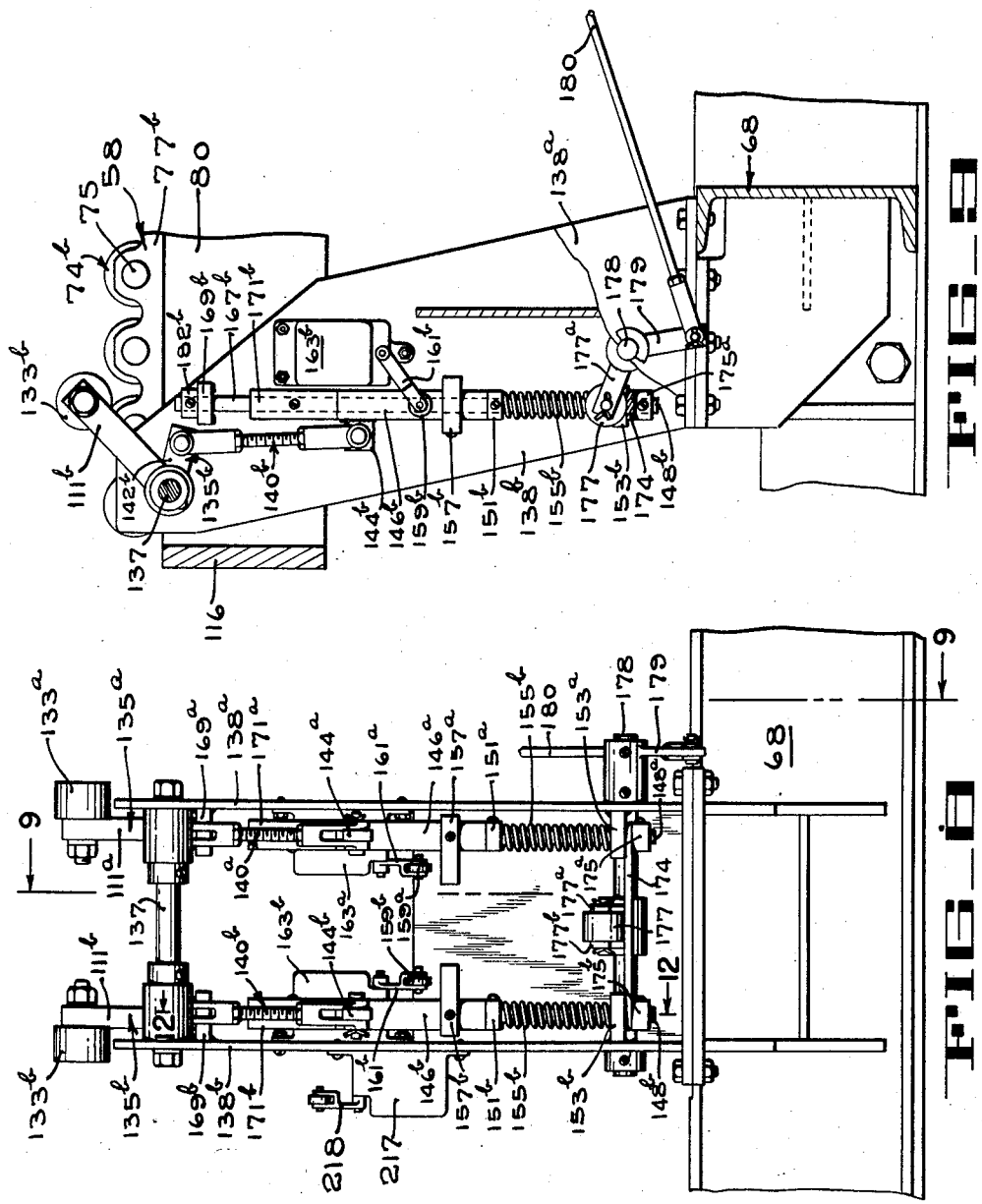
INVENTORS
ERNEST A. VERRINDER
JOHN R. RICHARDS
BY Hans G. Hoffmeister
ATTORNEY

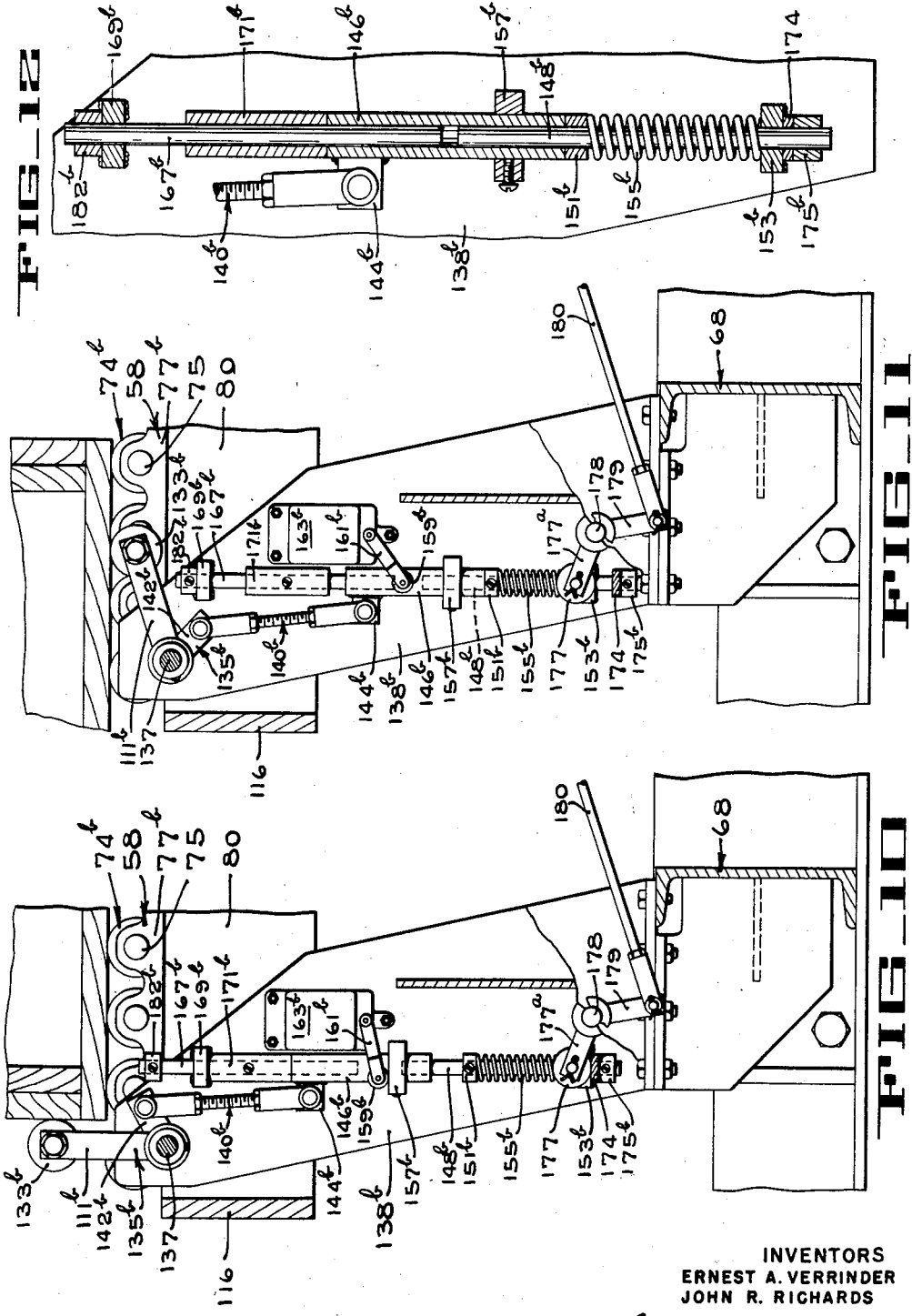

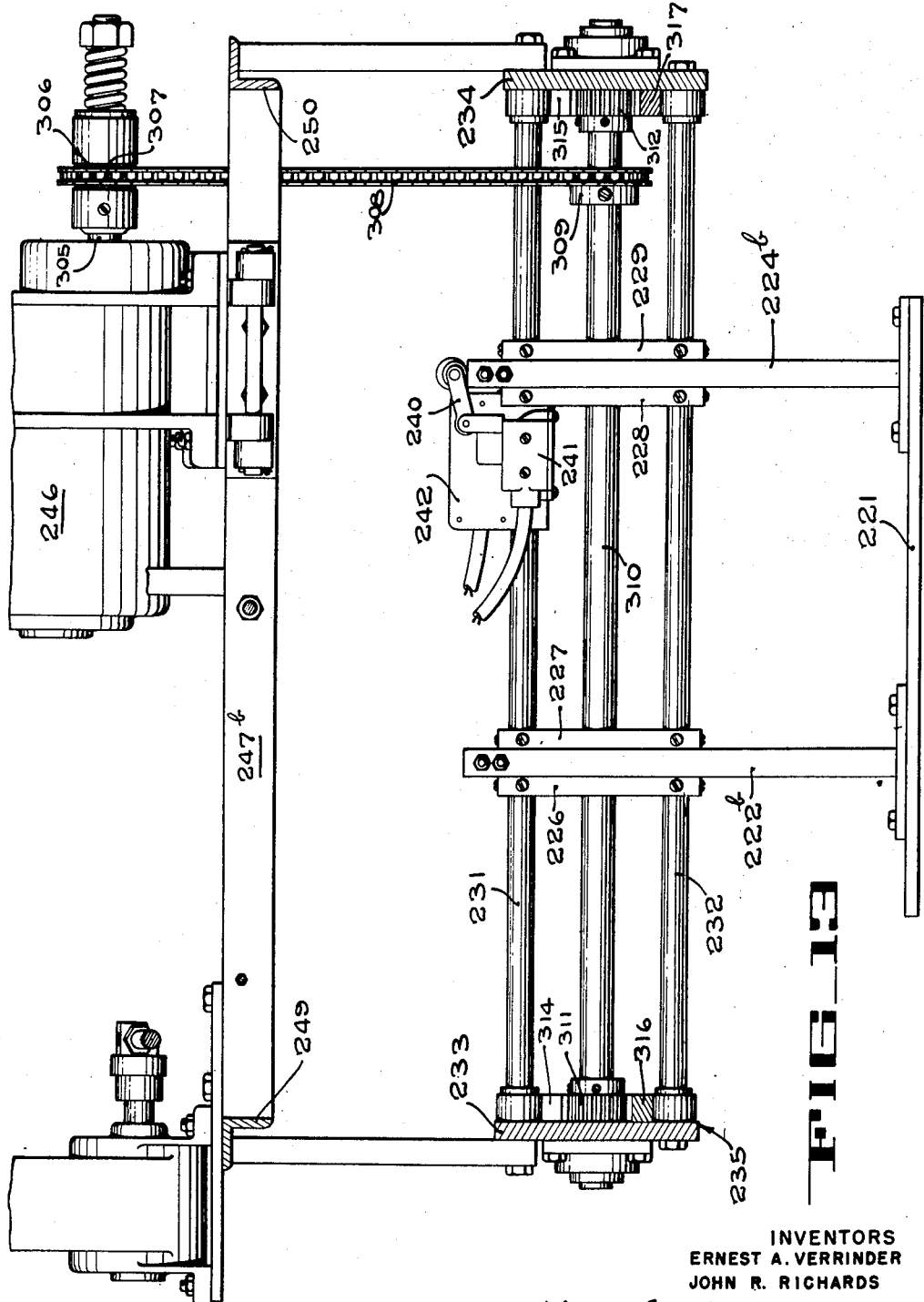

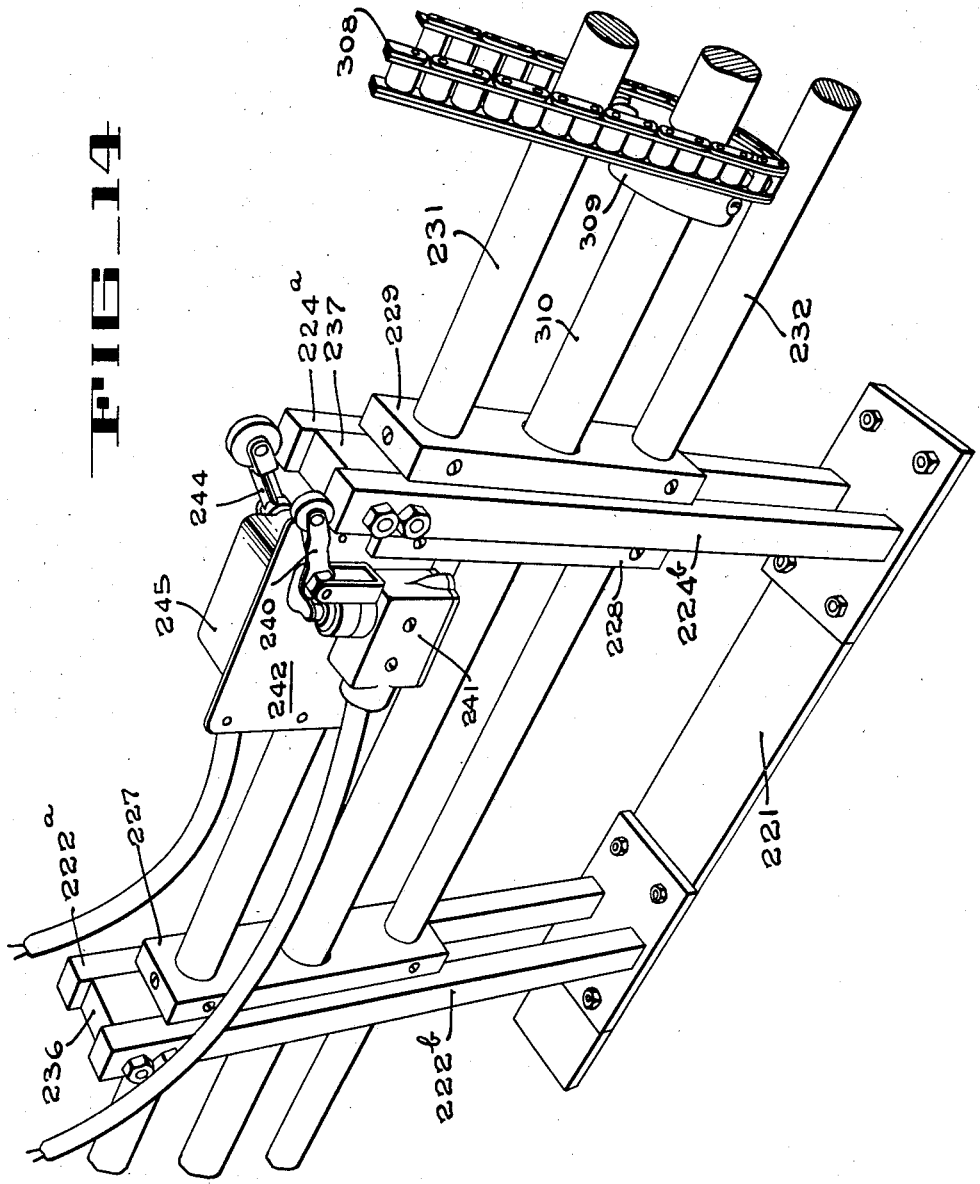

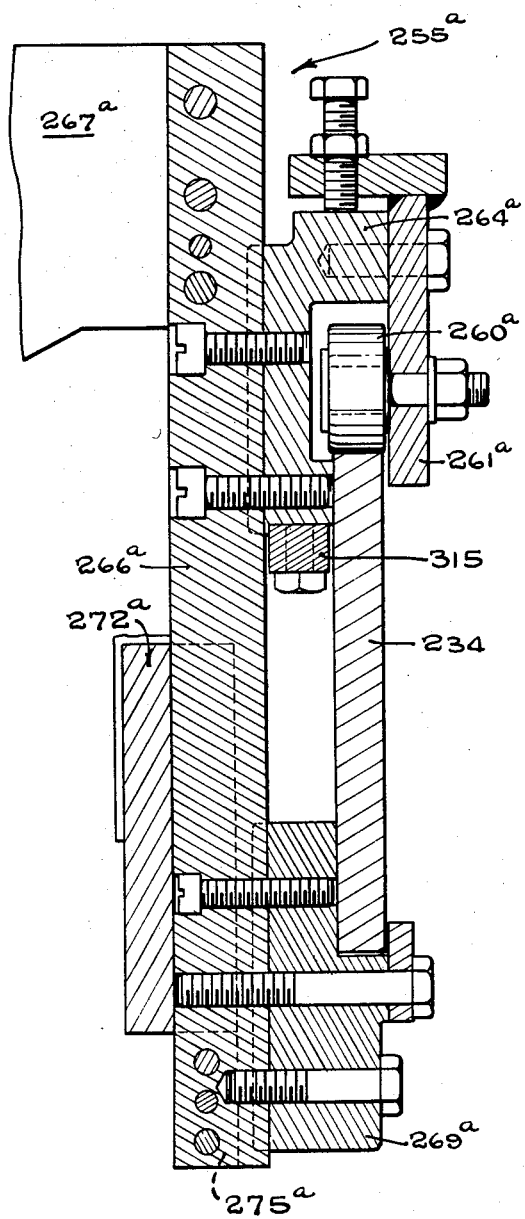

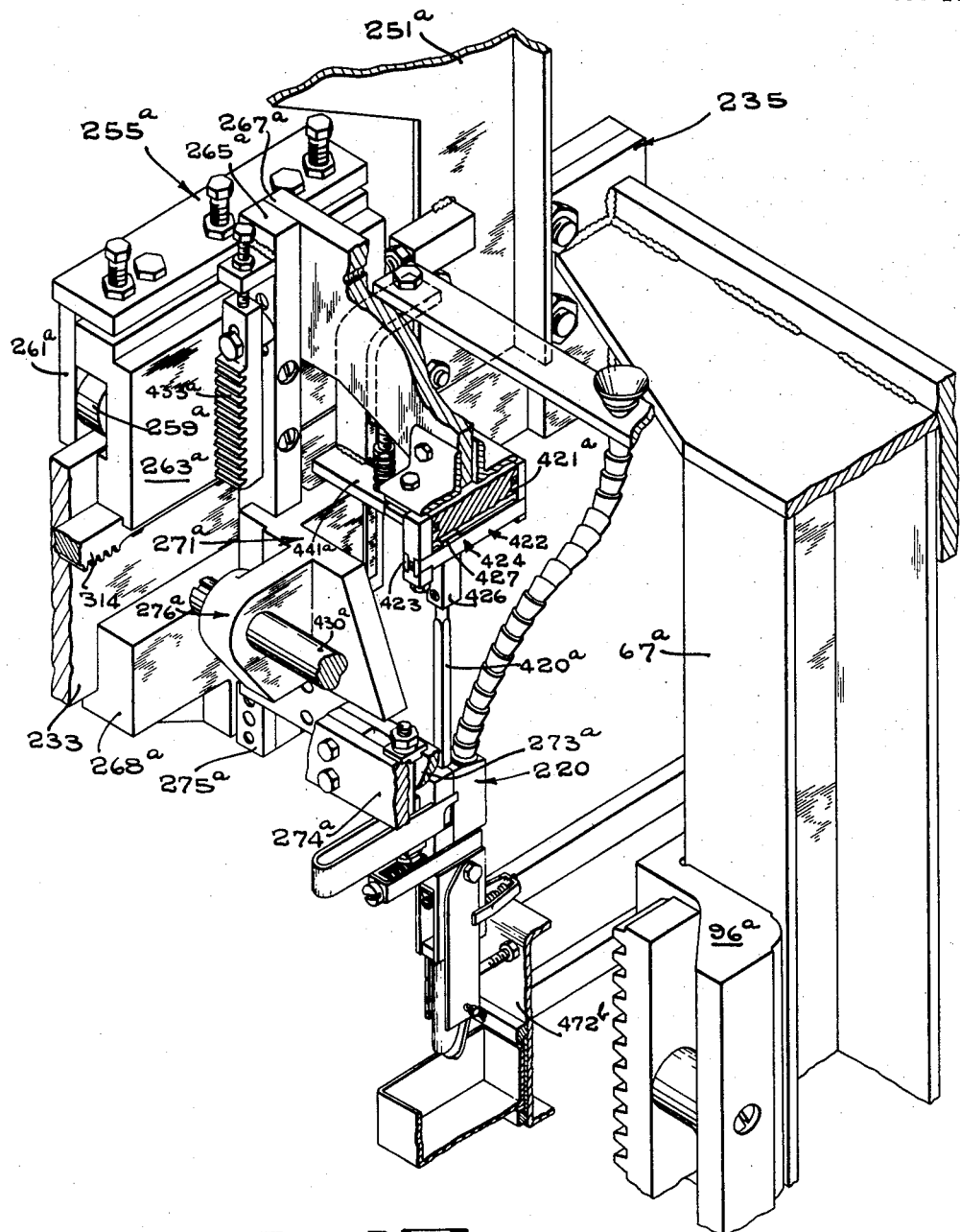
FIG_16

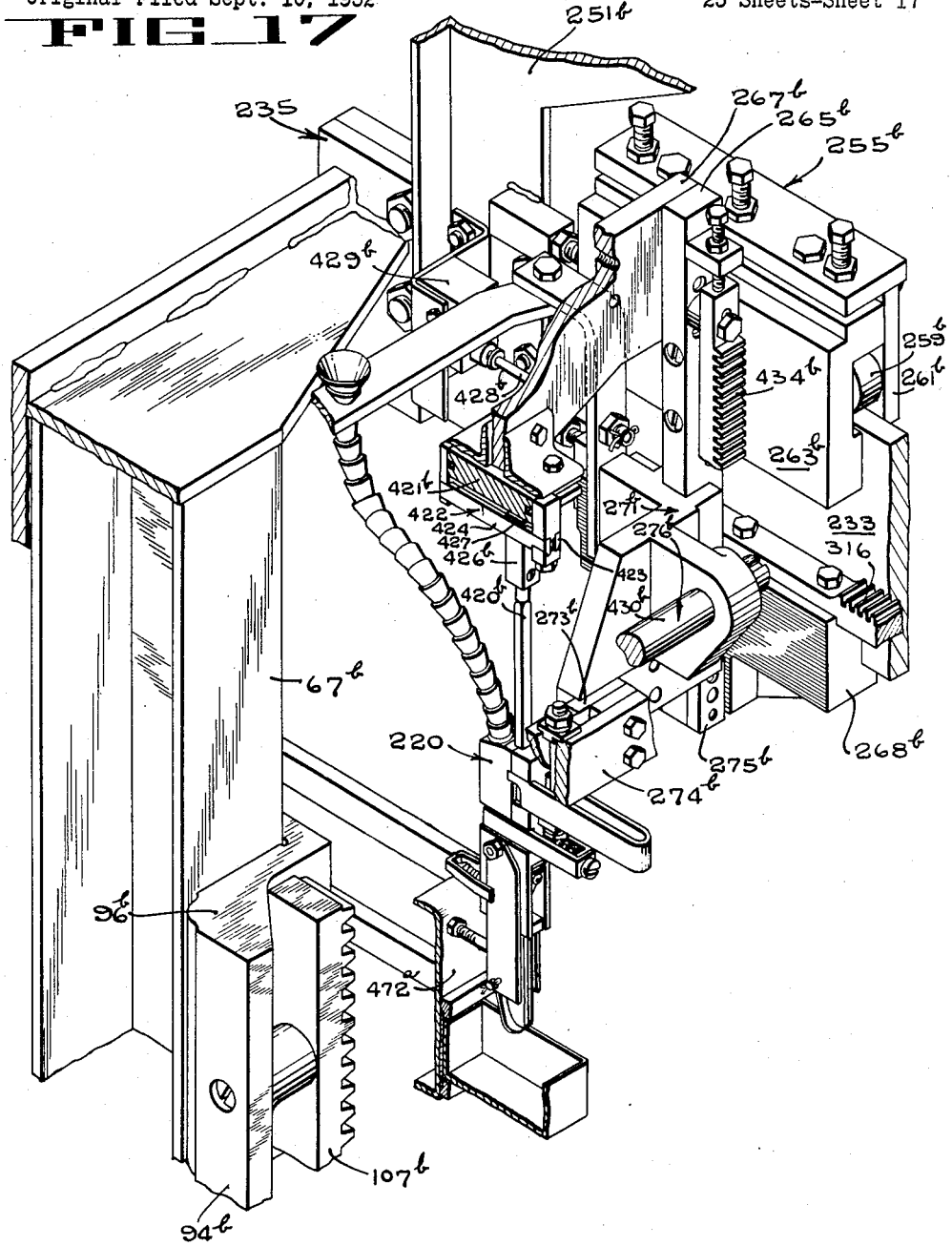

Dec. 30, 1958     E. A. VERRINDER ET AL     2,866,535
MACHINE FOR NAILING LIDS ON BOXES
Original Filed Sept. 10, 1952     25 Sheets-Sheet 18
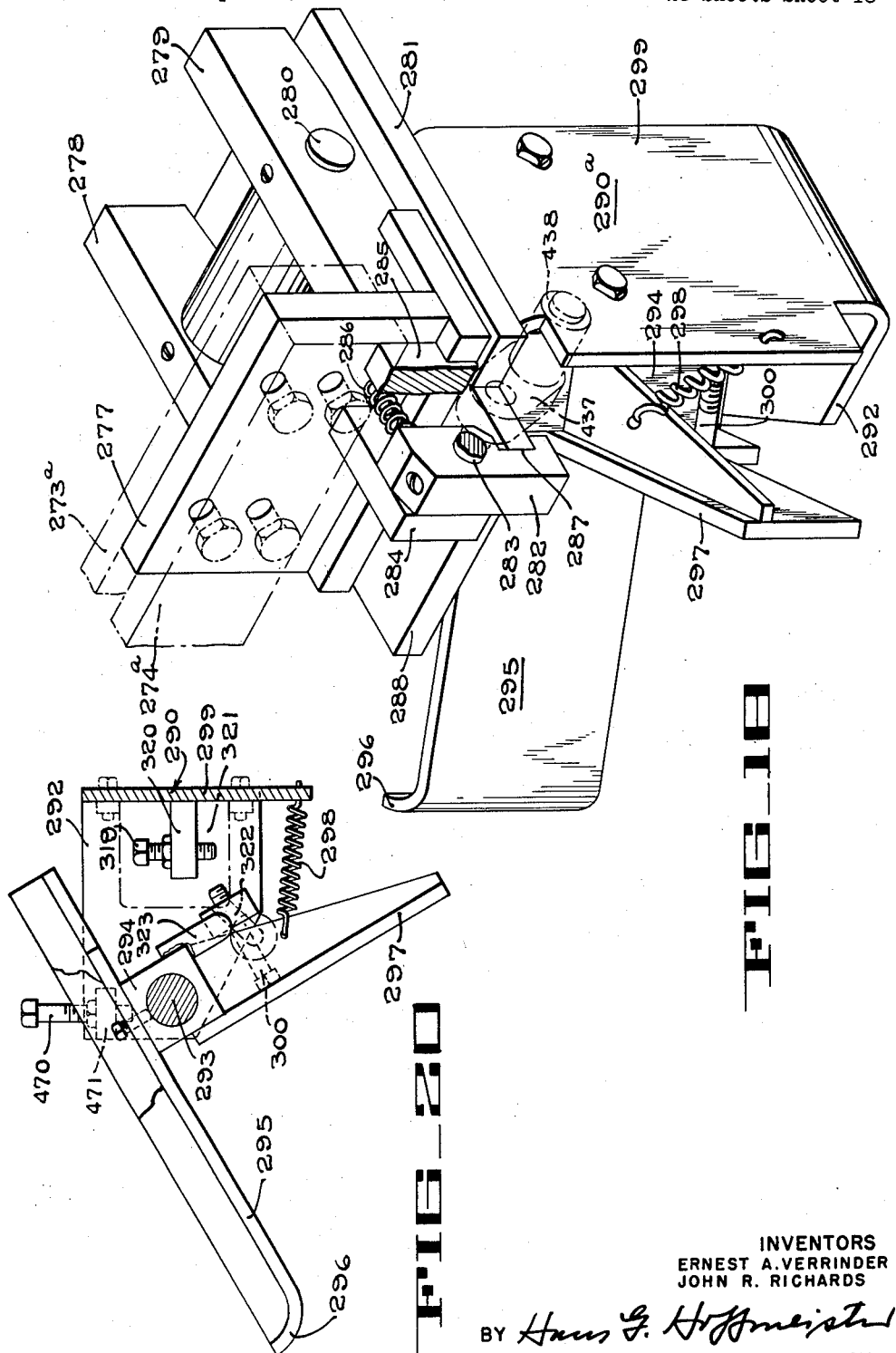
INVENTORS
ERNEST A. VERRINDER
JOHN R. RICHARDS
BY Hans G. Hoffmeister.
ATTORNEY Dec. 30, 1958    E. A. VERRINDER ET AL    2,866,535
MACHINE FOR NAILING LIDS ON BOXES
Original Filed Sept. 10, 1952    25 Sheets-Sheet 19
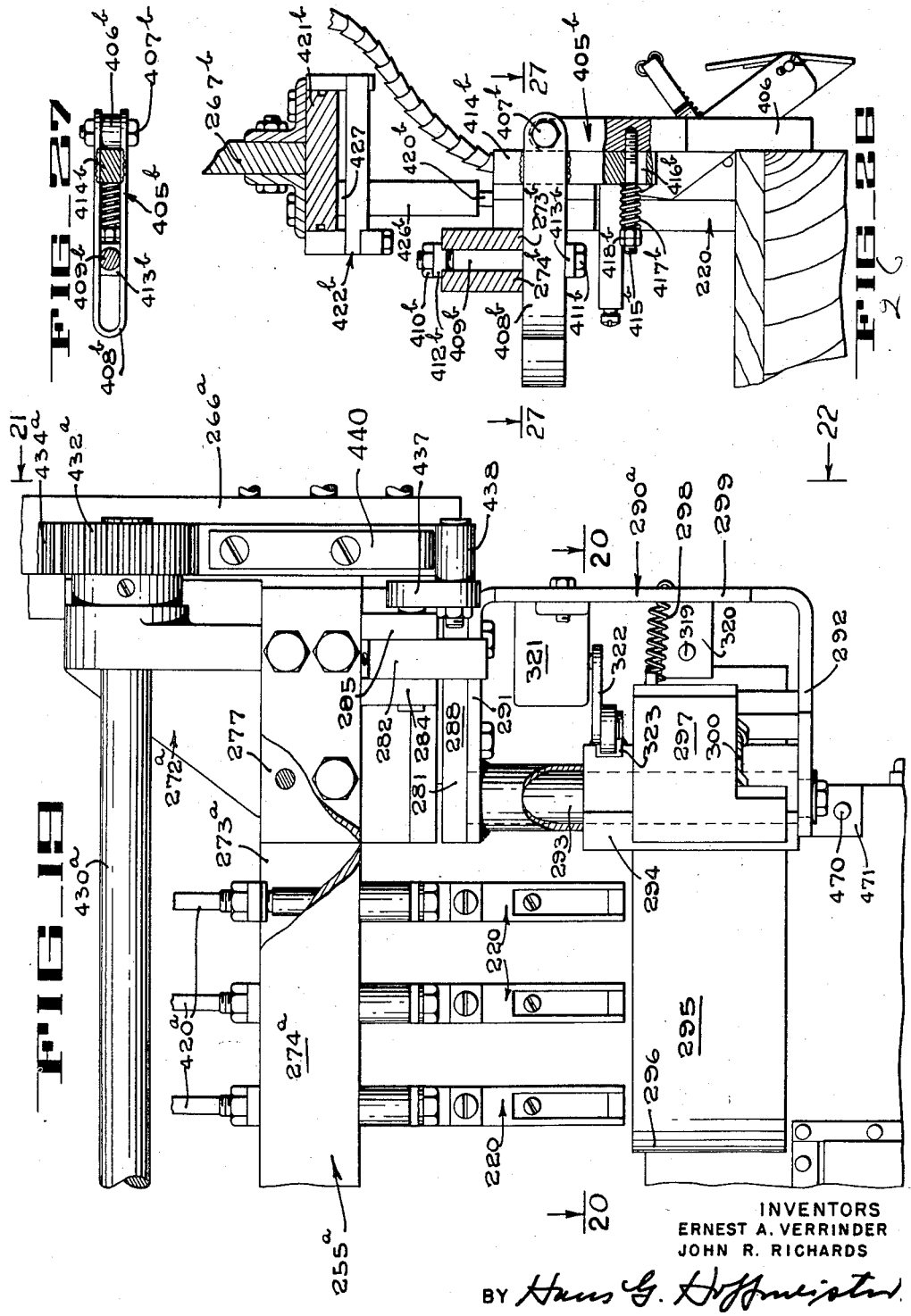
INVENTORS
ERNEST A. VERRINDER
JOHN R. RICHARDS
BY Hans G. Hoffmeister
ATTORNEY

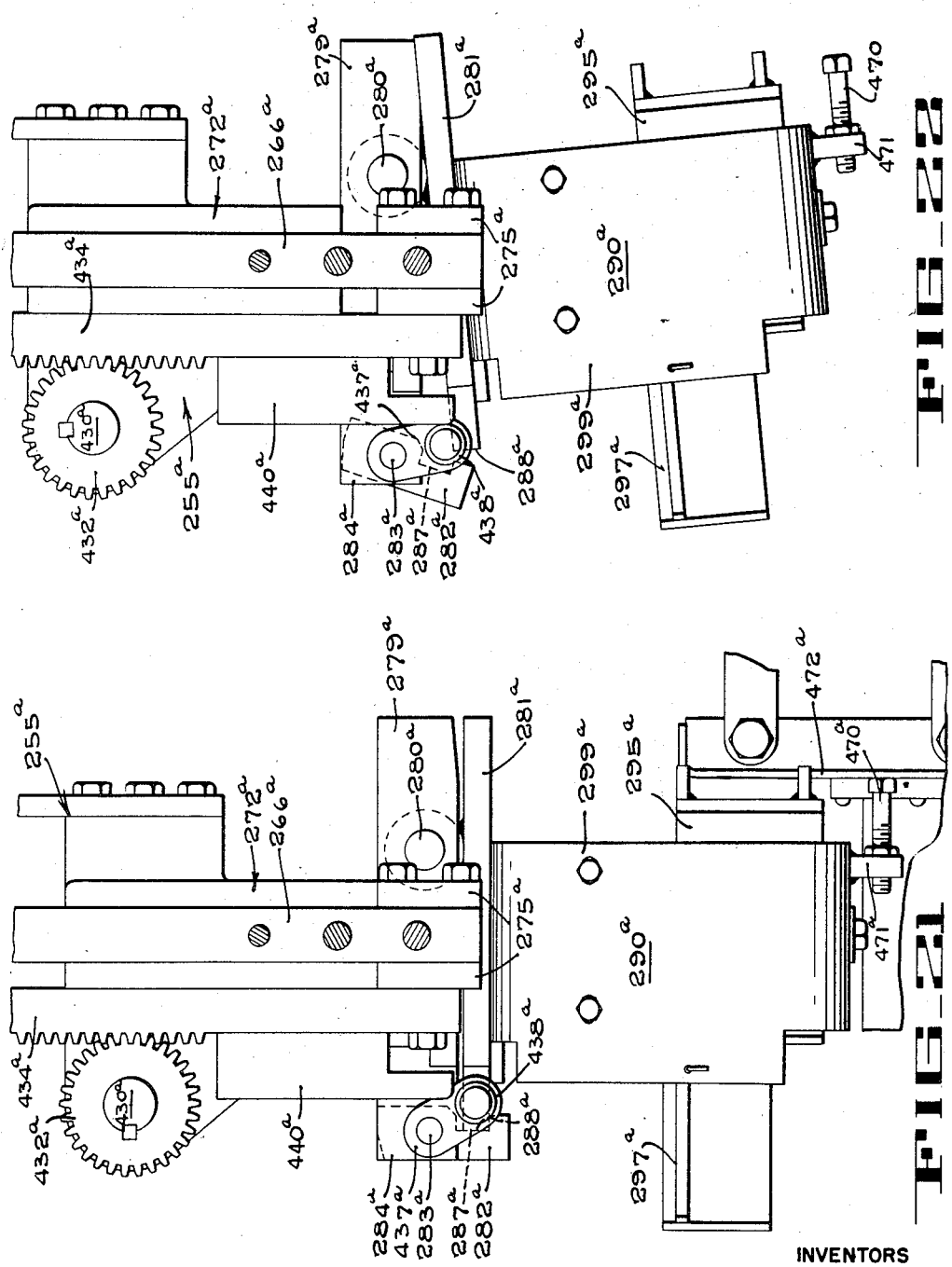

Dec. 30, 1958  E. A. VERRINDER ET AL  2,866,535
MACHINE FOR NAILING LIDS ON BOXES
Original Filed Sept. 10, 1952  25 Sheets-Sheet 21
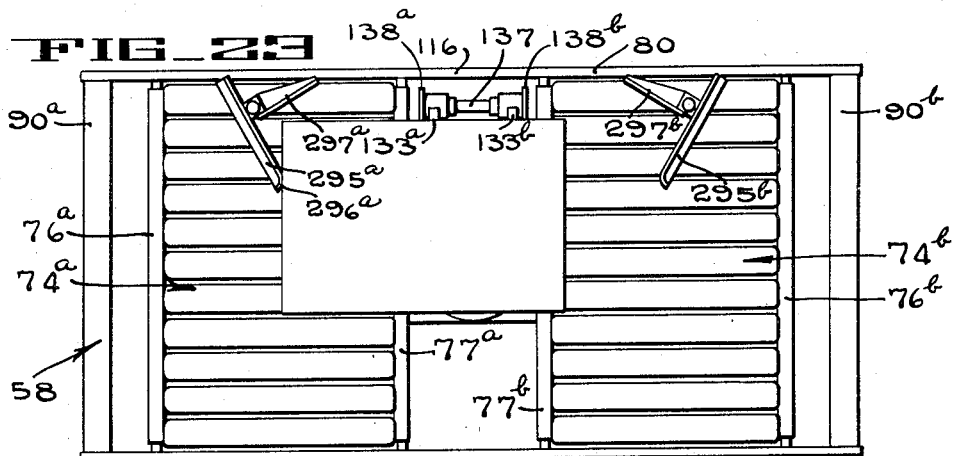
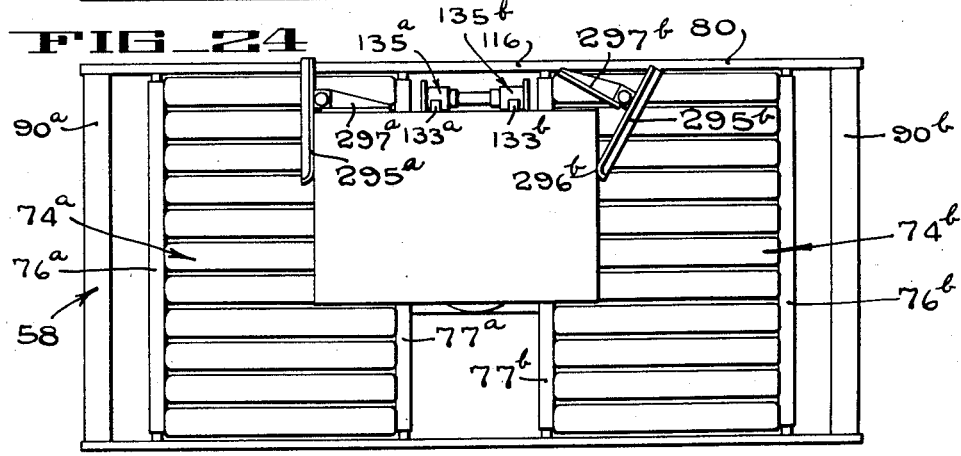
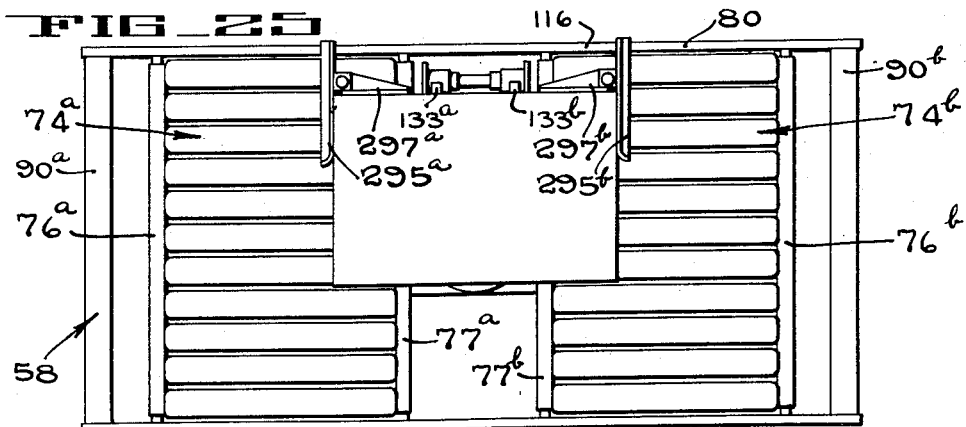
INVENTORS
ERNEST A. VERRINDER
JOHN R. RICHARDS
BY *Hans G. Hoffmeister*
ATTORNEY Dec. 30, 1958 E. A. VERRINDER ET AL 2,866,535
MACHINE FOR NAILING LIDS ON BOXES
Original Filed Sept. 10, 1952 25 Sheets-Sheet 22
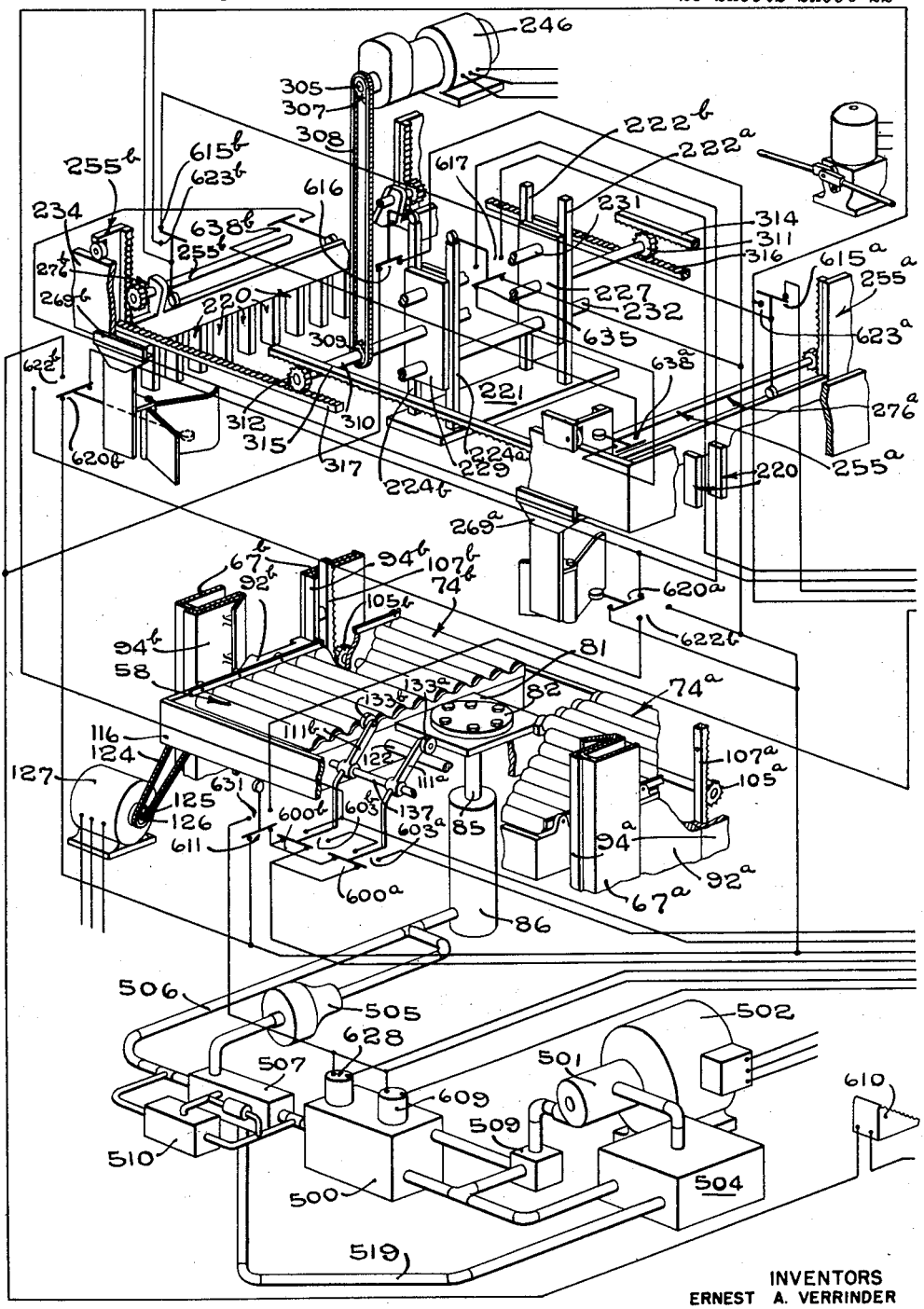
FIG_28
INVENTORS
ERNEST A. VERRINDER
JOHN R. RICHARDS
BY Hans G. Hoffmeister
ATTORNEY Dec. 30, 1958   E. A. VERRINDER ET AL   2,866,535
MACHINE FOR NAILING LIDS ON BOXES
Original Filed Sept. 10, 1952   25 Sheets-Sheet 23
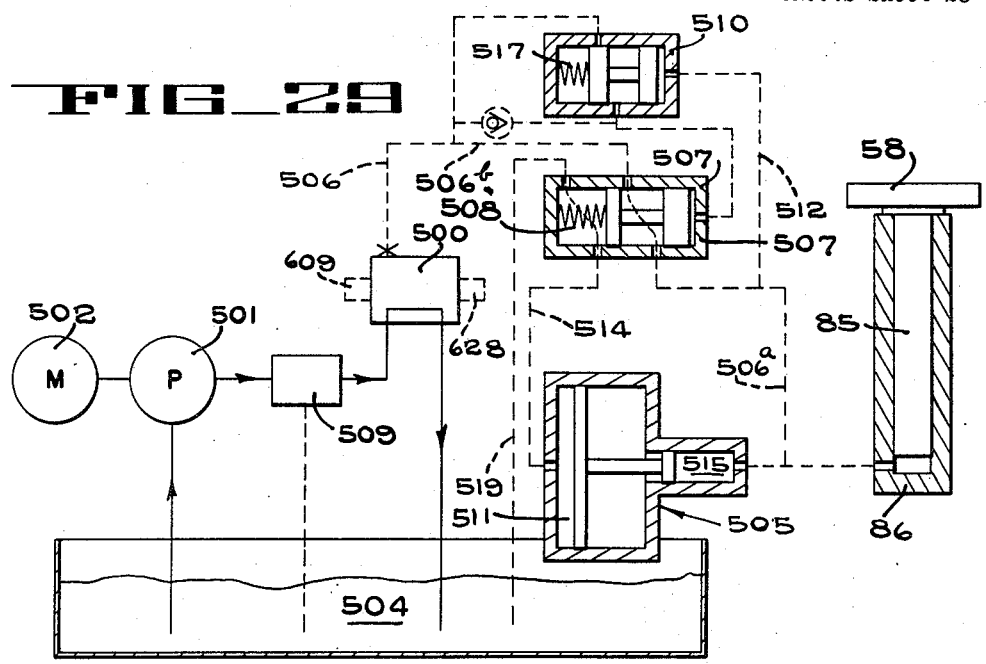
FIG_29
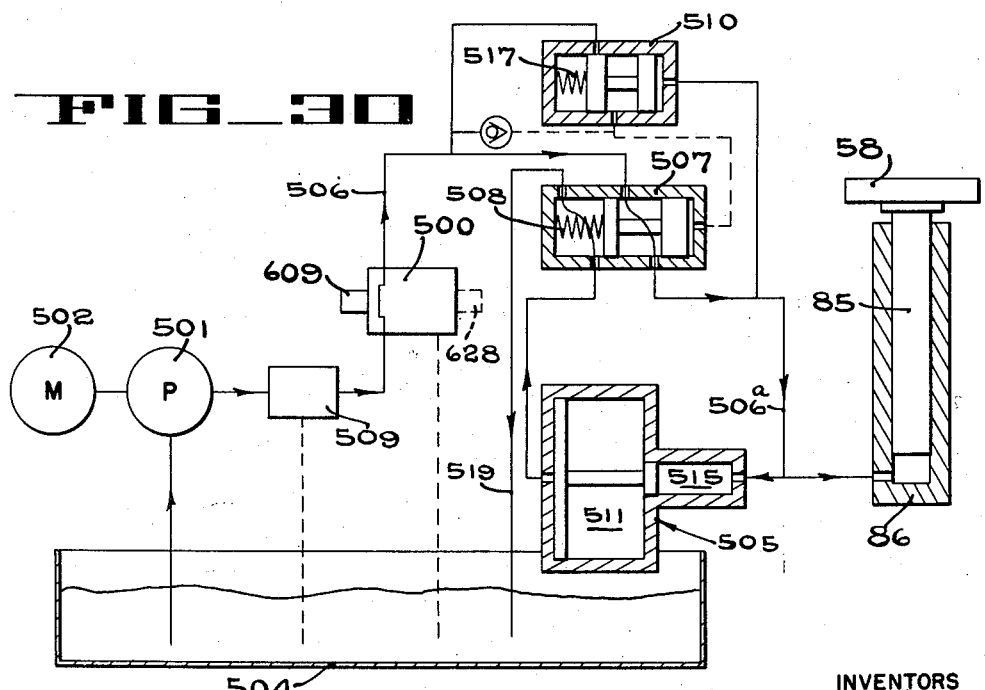
FIG_30
INVENTORS
ERNEST A. VERRINDER
JOHN R. RICHARDS
BY Hans G. Hoffmeister
ATTORNEY

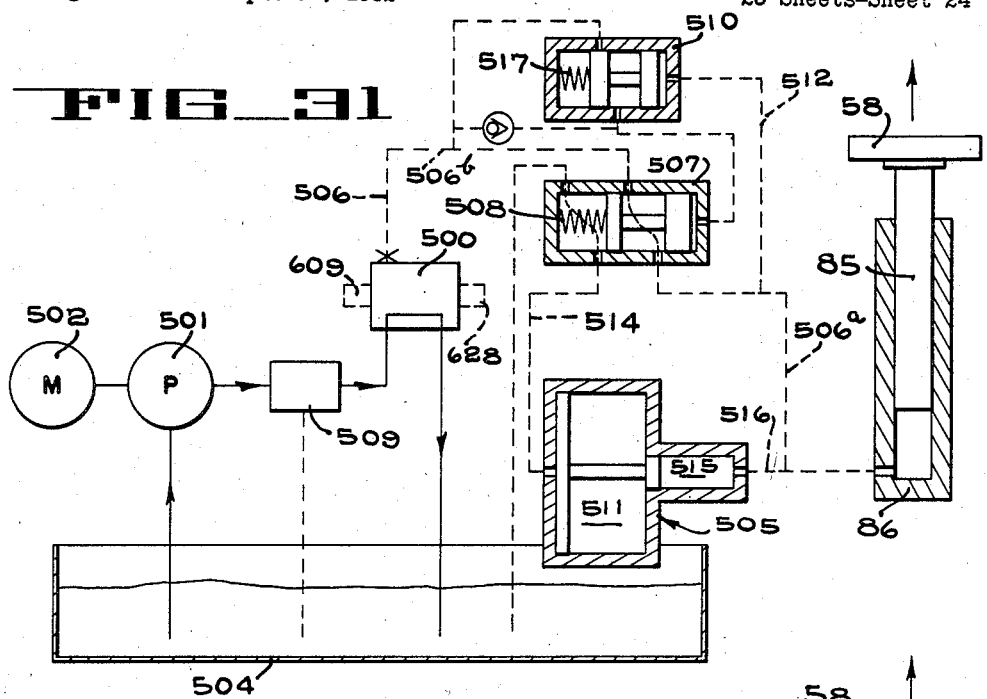
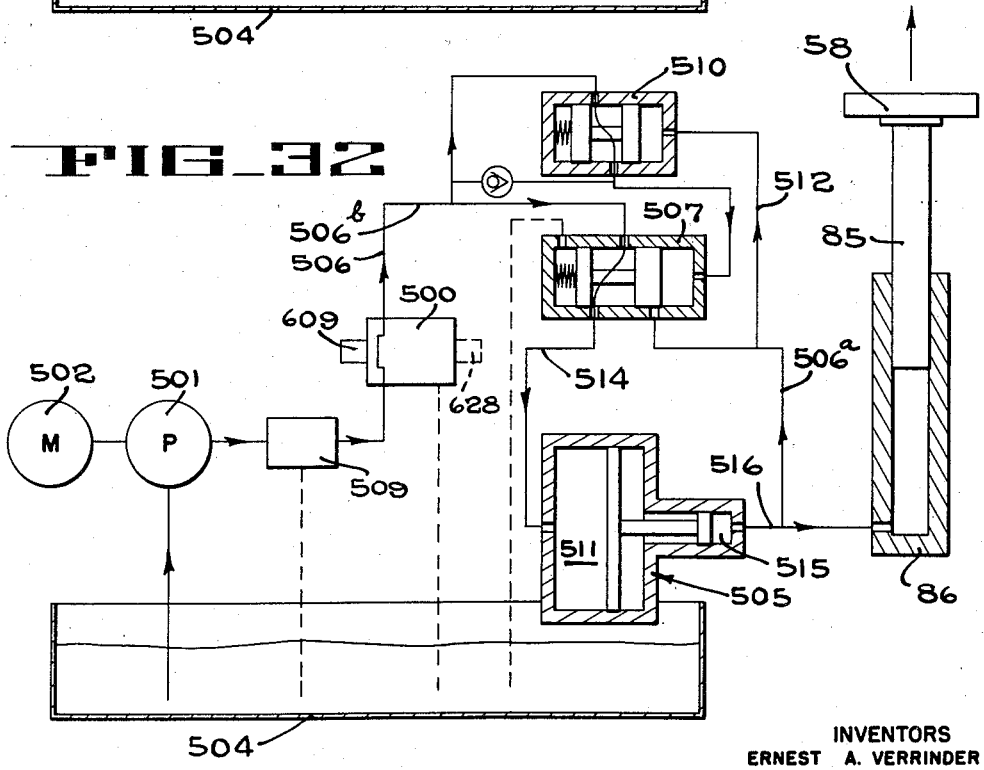

Dec. 30, 1958 E. A. VERRINDER ET AL 2,866,535
MACHINE FOR NAILING LIDS ON BOXES
Original Filed Sept. 10, 1952 25 Sheets-Sheet 25
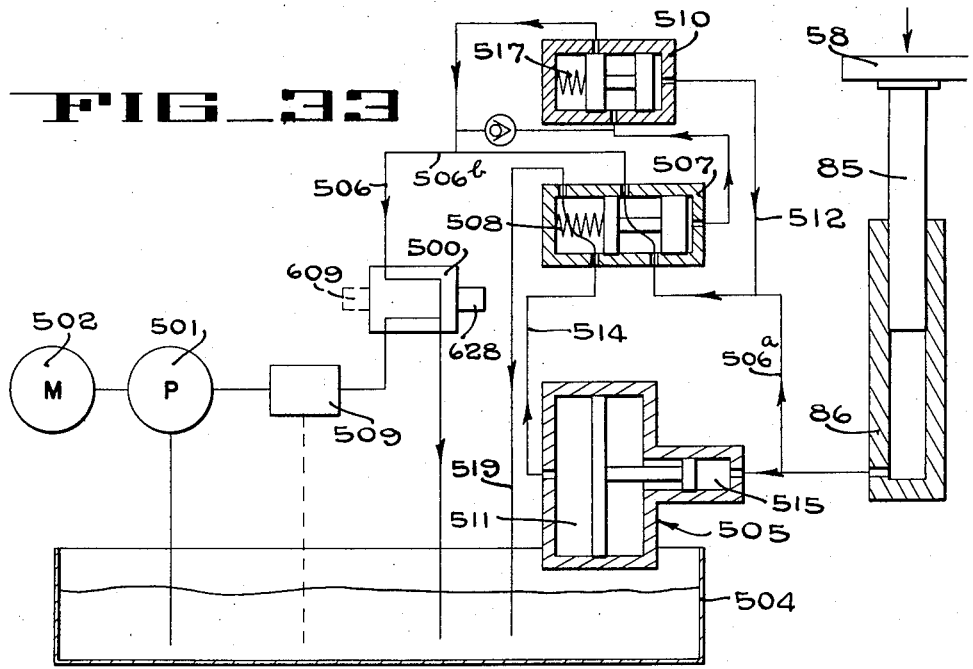
FIG_33
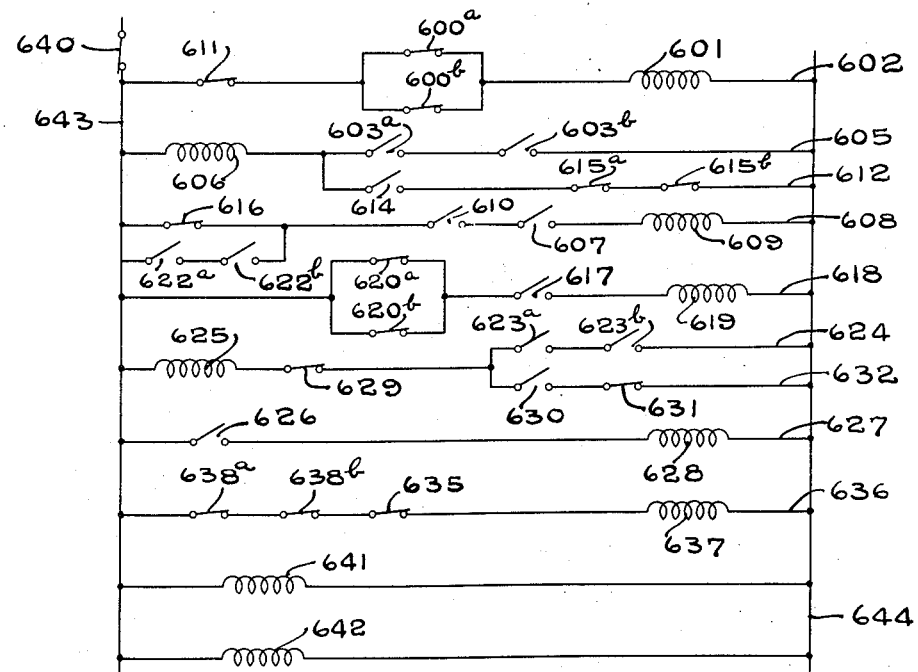
FIG_34
INVENTORS
ERNEST A. VERRINDER
JOHN R. RICHARDS
BY *Hans G. Hoffmeister*
ATTORNEY

United States Patent Office 2,866,535
Patented Dec. 30, 1958

2,866,535

MACHINE FOR NAILING LIDS ON BOXES

Ernest A. Verrinder and John R. Richards, Riverside, Calif., assignors to Food Machinery and Chemical Corporation, San Jose, Calif., a corporation of Delaware Original application September 10, 1952, Serial No. 308,785, now Patent No. 2,723,393, dated November 15, 1952. Divided and this application April 22, 1955, Serial No. 503,069

13 Claims. (Cl. 198—29)

The present invention relates to nailing machines. More particularly the present invention relates to machines for nailing lids on wooden crates or boxes. Machines of this type are commonly known as box lidding machines.

This application is a division of our copending application, U. S. Serial No. 308,785, filed Sept. 10, 1952, now Patent No. 2,723,393, for a machine for nailing lids on boxes.

It is an object of the invention to provide a box lidding machine that operates quickly and efficiently in orienting and centering boxes.

Another object is to provide a box lidding machine that may be used to lid boxes of a wide range of different sizes without requiring manual adjustment.

Yet another object is to provide a box lidding machine that automatically adjusts itself to boxes of a wide range of different sizes.

Another object is to provide an improved box-centering mechanism for a lidding machine.

Another object is to provide an improved box-orienting mechanism for a lidding machine.

These and other objects of the present invention will be apparent from the following description of the accompanying drawings which illustrate a preferred embodiment thereof and wherein:

Fig. 1 is a perspective of a box nailing machine embodying the invention as viewed from a point in front of the feed end thereof and including part of the supply conveyor.

Fig. 2 is another perspective of the same box lidding machine viewed from a point before the discharge end thereof and showing both the supply and discharge conveyors.

Figs. 3A and 3B are the left and right halves, respectively, of a front elevation of the box lidding machine.

Figs. 4A and 4B are fragmentary views of the upper and lower portions, respectively, of a vertical section through the box lidding machine taken along the line 4A—4A and 4B—4B of Figs. 3A and 3B, respectively.

Figs. 5A, 5B and 5C are the left, center and right portions, respectively, of an enlarged front elevation of a vertical section through the upper part of the box lidding machine taken along line 5—5 of Fig. 4A and viewed in the direction of the arrows associated with said figure.

Fig. 6 is a plan view of a horizontal section through the box lidding machine taken along line 6—6 of Fig. 4B.

Fig. 7 is a vertical section taken along line 7—7 of Fig. 6 illustrating the drive mechanism of the anvil upon which the boxes rest during the nailing operation.

Fig. 8 is a rear elevation of actuating mechanism for switches that control the operation of box positioning means comprised in the anvil.

Fig. 9 is a vertical section through the switch actuating mechanism illustrated in Fig. 8 taken along line 9—9 of said figure and viewed in the direction of the arrows associated with said line.

Figs. 10 and 11 are vertical sections through the same switch actuating mechanism showing said mechanism in different operational positions.

Fig. 12 is a fragmentary vertical section through the same switch actuating mechanism taken along line 12—12 of Fig. 8.

Fig. 13 is a fragmentary vertical section through the machine taken along line 13—13 of Fig. 5B.

Fig. 14 is a perspective illustrating the mechanism shown in Fig. 13 as viewed from a point at the rear end of the machine.

Fig. 15 is a sectional detail view taken along line 15—15 of Fig. 2 and illustrating, on an enlarged scale, a part of the carriages comprised in the machine of the invention.

Figs. 16 and 17 are fragmentary perspectives illustrating, respectively, the left and right front corners of the machine, as viewed from a point centrally of the machine.

Fig. 18 is a perspective of the left half of the box centering mechanism provided in the machine of the invention.

Fig. 19 is a fragmentary side elevation of said left box centering mechanism and surrounding structure as viewed from the inside of the machine.

Fig. 20 is a plan view of a horizontal section through said box centering mechanism taken along line 20—20 in Fig. 19.

Figs. 21 and 22 are fragmentary rear elevations of said box centering mechanism and its supporting structure as viewed in the direction of the arrows 21—22 indicated in Fig. 19, showing said mechanism in two different operational positions.

Figs. 23, 24 and 25 are plan views illustrating three sequential phases in the operation of the complete box centering mechanism.

Fig. 26 is a fragmentary front elevation, partly in section, illustrating mechanism for flushing the box lids with their boxes.

Fig. 27 is a horizontal section through the lid flushing mechanism illustrated in Fig. 26 taken along line 27—27 thereof.

Fig. 28 is of a three-dimensional diagram illustrating the hydraulic system employed to operate the anvil of the machine and the various electrical switches for controlling operation of the movable component mechanism comprised in the machine.

Figs. 29 to 33 are diagrams illustrating the successive operational positions of the hydraulic system employed in the machine; and Fig. 34 is a simplified diagram of the electrical circuit arrangement that controls operation of the machine.

Having first reference to Figs. 1 and 2, a suitable supply conveyor 50 delivers the boxes to be lidded, with their lid board, or boards, placed loosely thereon onto a service platform 56 which forms part of the box lidding machine proper. On the service platform 56 an attendant centers and squares the box roughly with regard to the machine such that the ends of the box to which the lid is to be nailed are at the attendant's left and right, and thereafter he pushes the box onto a power driven roller conveyor table 58 that operates to square the boxes accurately within the machine and which serves as anvil for the box during the actual nailing operation. The attendant then initiates operation of mechanisms that accurately center the squared box within the machine and which at the same time place the actual nailing mechanisms of the machine accurately above the end edges of the box lid, while flushing the lid with the box, whereupon the lid is actually nailed onto the end walls of the box. Upon completion of the actual nailing operation the hereinbefore mentioned roller anvil 58 operates to discharge the lidded box onto a suitable discharge conveyor 59 (Fig. 2).

*Supply conveyor and service platform*

The supply conveyor 50 may be of any suitable design. In the exemplary embodiment of the invention illustrated in the accompanying drawings, said supply conveyor comprises a power driven endless belt 60 supported on a sequence of transverse rollers 61 that are journaled in parallel side bars 62 and 63 which rest upon suitable legs 64.

The service platform 56 to which the supply conveyor 50 delivers the boxes comprises a horizontal plate 65 (Fig. 4B) that rests upon a frame structure 66 which is suitably secured to the side frames 67a and 67b of the machine (Fig. 1) and which may additionally be supported from the pedestal 68 of the machine by diagonal braces 69, as shown.

Suitably secured to and supported upon the upper surface of the table plate 65 is a multitude of uniformly distributed annular ball bearings 70 within which may freely revolve individual balls 71 (Fig. 4B) upon whose projecting upper segments even the heaviest product-filled box may readily be shifted by an attendant until it is approximately squared with, and centered transversely of, the machine with its longest sides roughly parallel to the transverse perimeter of the machine. The attendant then pushes it onto the hereinbefore mentioned roller anvil 58 whose power driven rollers draw the box underneath the actual nailing mechanism. From this moment on, the machine takes over completely, adjusts the position of the box accurately, nails down upon it the lid board or boards and finally discharges the lidded box without requiring any manual adjustment on the attendant's part, though the box may vary greatly in length, width and/or depth from the box processed in the directly preceding cycle of operation of the machine.

*The box-supporting anvil*

The roller anvil 58 comprises two transversely spaced sets of rollers 74a and 74b (Fig. 6). The opposite ends of said rollers are provided with tenons 75 (Fig. 7) that are rotatably received in bearing bars 76a, 77a and 76b, 77b, respectively. Said bearing bars extend across and are suitably secured to a rectangular frame 80. Intermediately of the inner bearing bars 77a and 77b, said frame forms a web 81 (Fig. 4B) that is bolted to a plate 82. Said plate has a downwardly extending stem 83 which is seated in the upper end of a tubular piston 85 that is slidably received within an upright hydraulic cylinder 86. Said cyclinder is bolted to the pedestal 68 of the machine and may be operated to raise or lower the anvil 58 as described in greater detail in our aforementioned copending application. To confine a box delivered onto the anvil, laterally within the supporting area provided by the upper surfaces of the rollers 74a and 74b, guide runners 78a and 78b, extending longitudinally of the machine may be suitably supported from the outer bearing bars 76a and 76b, respectively, as best shown in Figs. 4B and 6.

To insure that the roller table 58 retains its horizontal position relative to the actual nailing mechanisms as it is raised or lowered by the hydraulic cylinder 86, its end bars 90a and 90b carry guide blocks 92a and 92b, respectively, that are slidably received within vertical guideways 94a and 94b formed by pairs of spaced vertical castings 96a, 97a and 96b, 97b which are bolted to the vertical posts or girders which form the side frames 67a and 67b of the machine (Fig. 6). Moreover, the end bars 90a and 90b of the rectangular frame 80 may carry rotatable pinions 105a and 105b which are firmly mounted upon a common transverse shaft 106 and which mesh with vertical rack bars 107a and 107b, respectively, that are suitably supported from the hereinbefore mentioned vertical castings 96a and 96b which form the front portions of the guideways 94a and 94b.

During the initial phase in each operational cycle of the machine all the rollers 74a and 74b of the anvil 58 are in a constant state of rotation in clockwise direction as viewed in Fig. 4B to draw boxes away from the service platform 56 and against the arms 111a and 111b of actuating mechanisms for two box positioning switches 600a and 600b, respectively, Figs. 28 and 34, located adjacent the rear bar 116 of the rectangular frame 80 intermediately of the two sets of rollers 74a and 74b. For turning the rollers in the defined manner, the outwardly directed tenons of said rollers project through their respective bearing bars 76a and 76b, and carry sprockets 117a and 117b, respectively, around which are trained endless sprocket chains 119a and 119b. Below the level of the sprockets 117a and 117b, said chains are engaged by a drive sprocket 121 (Fig. 7) and both the drive sprockets 121 comprised in the machine are mounted upon a transverse shaft 122 that is rotatably supported from the rectangular frame 80 in any suitable manner and which carries a third sprocket 123 (Fig. 6). A sprocket chain 124 connects said third sprocket 123 with yet another sprocket 125 mounted upon the drive shaft 126 of an electric motor 127 that is suitably suspended from the rectangular frame 80 for movement therewith as shown in Fig. 3B.

The power switch for the electric motor 127 is controlled by a relay 601 located in a control circuit 602 that includes the two normally closed parallel switches 600a and 600b (Fig. 34), the arrangement being such that energization of the relay 601 closes the power circuit of the motor 127 and thus initiates operation thereof. The hereinbefore mentioned arms 111a and 111b are arranged to open the switches 600a and 600b individually whenever a box is delivered against said arms by the rotating rollers 74a and 74b and presses them backwardly from their normally forwardly inclined position (Fig. 9) into the upright position illustrated in Fig. 10. Hence, whenever a box is delivered obliquely against said arms such that initially only one of the arms is pressed backwards, the electric motor 127 for the rollers 74a and 74b will continue to operate since only one of the switches 600a or 600b, respectively, is opened, and power continues to flow to the control relay 601 through the other switch which remains closed. However, with the projecting rear corner of the box restrained from further rearward travel by the stop arm 111a or 111b, as the case may be, and the rollers 74a and 74b continuing to rotate, the trailing side of the misaligned box is urged forwardly until it fully presses against the other arm, which places the rear wall of the box into exact parallelism with the rear bar 116 of the rectangular frame 80 so that the box is properly squared with regard to the machine. At this moment both the paths of power to the control relay 601 established by the switches 600a and 600b are interrupted and the motor 127, therefore, ceases to operate, suspending rotation of the rollers 74a and 74b. In order to increase the dependability of the described box squaring mechanism and to avoid the possibility of accidental misalignment of the box, once alignment has been achieved in the described manner, the motor 127 is preferably of the self-braking type causing instantaneous cessation of rotation of its drive shaft and of the rotating elements driven from said drive shaft whenever the power supply to the motor is interrupted.

The manner in which the arms 111a and 111b are operatively connected to their respective switches 600a and 600b is illustrated in Figs. 8, 9, 10, 11 and 12. Both the switch arms 111a and 111b carry rollers 133a and 133b at their upper ends and form part of bell cranks 135a and 135b, respectively, that rotate upon a transverse shaft 137 which extends between, and is mounted in, the upper ends of a pair of wing-shaped plates 138a and 138b that rise from, and are bolted to, the pedestal 68 of the machine. Adjustable links 140a and 140b pivotally connect the lower arms 142a and 142b of the bell cranks 135a and 135b, respectively, to lugs 144a and 144b that project radially from sleeves 146a and 146b which slidably embrace vertical guide rods 148a and 148b, and which rest upon collars 151a and 151b that are pinned to said guide rods (Fig. 9). Said guide rods slide in ears 153a and 153b projecting inwardly from the wing-shaped plates 138a and 138b near the lower ends thereof, and springs 155a and 155b coiled around said rods below the collars 151a and 151b and bearing against the upper sides of said ears yieldably maintain the rods 148a and 148b, and hence the sleeves 146a and 146b, in a position wherein the stop arms 111a and 111b of the described power train are forwardly inclined as illustrated in Fig. 9, and shelves 157a and 157b projecting laterally from the sleeves are located a limited distance below rollers 159a and 159b provided at the lower ends of the actuating arms 161a and 161b of the switches 600a and 600b which are located in boxes 163a and 163b that are supported from the wing-shaped mounting plates 138a and 138b, respectively. Said switches 600a and 600b are normally in a closed position, as explained hereinbefore, but when a box is delivered against the arms 111a and 111b and presses said arms backwards into the upright position illustrated in Fig. 10, the sleeves 146a and 146b are raised until the shelves 157a and 157b engage the rollers 159a and 159b and swing the switch arms 161a and 161b in clockwise direction as viewed in Fig. 9, into the position illustrated in Fig. 10, which opens the switches 600a and 600b contained in the boxes 163a and 163b, respectively. This as previously described, is instantaneously effective to terminate rotation of the box positioning rollers 74a and 74b. To limit the extent to which the forwardly inclined control arms 111a and 111b may yield under the force of a box delivered thereagainst, to the upright position illustrated in Fig. 10 vertical rods 167a and 167b slidably retained in ears 169a and 169b projecting inwardly from the mounting plates 138a and 138b near the upper ends thereof engage the upper ends of the sleeves 146a and 146b, respectively (Fig. 12) and pinned to said rods 167a and 167b above said sleeves 146a and 146b are short tubular members 171a and 171b. Thus, whenever, the switch actuating sleeves 146a and 146b move upwardly under the force of a box delivered against the stop arms 111a and 111b, said sleeves come against, and lift, the tubular members 171a and 171b with the rods 167a and 167b pinned thereto until said tubular members strike against the upper ears 169a and 169b, when further upward movement of the actuating sleeves 146a and 146b is positively arrested, and the arms 111a and 111b yield no further in backward direction (Fig. 10).

Means may be provided which permit an attendant to retract the stop arms 111a and 111b below the upper surface of the roller anvil 58 (in its lowermost position wherein it is on the level of the discharge conveyor 59) so that he may pass any box delivered to the roller anvil directly onto the discharge conveyor 59 without subjecting it to a nailing operation. For this purpose, a transverse shelf 174 is retained on the lower ends of the guide rods 148a and 148b below the ears 153a and 153b by means of collars 175a and 175b that are pinned to said guide rods as best shown in Fig. 8, and the upper face of said shelf is engaged by a roller 177 that is pivotally supported between two arms 177a and 177b firmly secured to a transverse shaft 178 which is rotatably mounted in the hereinbefore described wing-shaped mounting plates 138a and 138b. Secured to one of the projecting ends of said transverse shaft 178 is another downwardly directed arm 179 (Figs. 9, 10 and 11) which is pivotally connected to an actuating rod 180 that extends to the front of the machine where it may be provided with a suitable handle 181 as shown in Figs. 1 and 4B. Whenever the attendant wishes to pass a box without subjecting it to the nailing operation, he merely pulls the handle 181 which swings the transverse shaft 178 in counterclockwise direction as viewed in Fig. 11 and as a result thereof, presses the roller 177 downwardly upon the shelf 174. Whenever the shelf 174 is depressed, it pulls the rods 148a and 148b downwardly and depresses the coil springs 155a and 155b. This permits the actuating sleeves 146a and 146b to drop, and as a result thereof the stop arms 111a and 111b swing in a clockwise direction as viewed in Fig. 9 below the level of the rollers 74a and 74b upon which the boxes travel (Fig. 11) and which rollers remain in full operation since the described actuation of the stop arms 111a and 111b remains without effect upon the switch actuating arms 161a and 161b. Hence, any box that may be supported upon said rollers at the time, will be quickly passed on to the discharge conveyor 59 without hindrance of any kind, and as soon as the attendant releases the actuating rod 180, the springs 155a and 155b restore the mechanism to its original condition as illustrated in Figs. 8 and 9 wherein the stop arms 111a and 111b project in a forwardly inclined position into the path of a box traveling on the roller table 58. To prevent that the rods 167a and 167b, which carry the tubular members 171a and 171b, may drop through the lugs 169a and 169b, respectively, whenever the stop arms 111a and 111b are depressed in the described manner, collars 182a and 182b may be pinned to the upper ends of said rods above the lugs 169a and 169b as shown.

It will readily be apparent that the described arrangement also permits depression of the stop arms 111a and 111b in clockwise direction from the position shown in Fig. 9 into the position illustrated in Fig. 11 without actuating the switch arms 161a and 161b, respectively.

Reverting now to the switch boxes 163a and 163b, said boxes do not only contain the previously mentioned normally closed switches 600a and 600b that form parallel paths of power to the control relay 601 of the roller table motor 127, they also contain normally open switches 603a and 603b, respectively (Fig. 28) that lie in series in the power circuit 605 of a relay 606 (Fig. 34) adapted upon energization to close a switch 607 in the power circuit 608 of a solenoid 609. Said solenoid is adapted upon energization to move a hydraulic control valve 500 (Fig. 28) from a neutral position into an operative position where it directs flow of hydraulic fluid from a continuously operating pump 501 driven by a motor 502 to the hereinbefore mentioned hydraulic cylinder 86 which controls the vertical position of the anvil 58. Whenever backward movement of both the stop arms 111a and 111b moves the switch arms 161a and 161b to open the switches 600a and 600b and thus terminates rotation of the rollers 74a and 74b, said switch arms simultaneously close the normally open switches 603a and 603b and in this manner ready the solenoid 609 for actuation as soon as the attendant depresses a normally open pedal switch 610 (Fig. 34) located in front of the machine pedestal 68 (Fig. 1) which also lies in the power circuit 608 of said solenoid 609, as will be explained in greater detail hereinafter.

The hydraulic cylinder which raises and lowers the anvil 58 of the machine may be of any suitable construction. A detailed description of the preferred embodiment thereof is fully disclosed in our aforementioned copending application.

Reverting again to the box resting upon the anvil 58 with its rear wall bearing fully against the stop arms 111a and 111b, the resultant actuation of the switch arms 161a and 161b is effective to terminate rotation of the rollers 74a and 74b and to ready the anvil raising solenoid 609 of the hydraulic system for operation, as hereinbefore described. The attendant now steps on the pedal switch 610 which closes the power circuit of said solenoid. The solenoid thus energized actuates the valve mechanism 500 to direct the output of the continuously operating pump 501 into the hydraulic cylinder 86. As a result thereof, the roller table 58 with the squared box resting thereon begins to rise. As soon as the rising anvil 58 has lifted the box above the stop arms 111a and 111b, however, said arms return to their forwardly tilted position under the urgency of their restore springs 155a and 155b permitting the switches 600a and 600b in the control circuit 602 of the roller motor 127 to close and the switches 603a and 603b in the power circuit 605 of the master relay 606 to open (Fig. 34). To prevent the roller motor from resuming operation when the switches 600a and 600b close (which would eject the box from the rising anvil 58), the control circuit 602 of said motor contains another switch 611 which is spring-urged into open position, but is held closed by the anvil 58 as long as said anvil is in its lowermost position (Fig. 28). Having reference to Figs. 4B and 8, said switch 611 may be housed in a switch box 217 secured to the hereinbefore described wing-shaped support plate 138b of the actuating mechanism for the roller stop and table elevating switches at such a level that its actuating arm 218 is engaged and depressed by the anvil frame 80 whenever said anvil is in its lowermost position. Further, to prevent the master relay 606 from becoming de-energized, which would cause de-energization of the table raising solenoid 609, as soon as return of the box stop arms 111a and 111b to their normal forwardly inclined position permits the switches 603a and 603b in the power circuit 605 of said master relay to open, the switches 603a and 603b are shunted by another power path 612 containing a normally open switch 614 and normally closed switches 615a and 615b. Said normally open switch 614 is arranged to close as soon as, and to remain closed as long as, the master relay 606 is energized, and thus establishes a holding circuit for said master relay which continues to keep the same energized after the switches 603a and 603b have returned to their normally open positions. Hence, the hydraulic anvil may continue to rise, and the rollers 74a and 74b thereof will remain at rest, even after the anvil has lifted the box above the stop arms 111a and 111b and said arms have returned to the forwardly inclined positions illustrated in Fig. 9 wherein the switches 600a and 600b are closed and the switches 603a and 603b are open.

Disposed a distance above the roller anvil 58 (in its lowermost box-receiving position) sufficient to accommodate boxes of maximum depth are the so-called nail chucks 220 (3A, 3B, 5A, and 5C) that hold the nails to be driven through the lid and which is described in detail in our aforementioned copending application. As soon as the lid of the box on the rising anvil 58 reaches a level somewhat below the level of said chucks, control means enter into operation that arrest temporarily further upward movement of the table 58 and which initiate operation of mechanisms that properly center the box on the table in a direction transversely of the machine. Said control means may have the form of the horizontally positioned plate 221 (Figs. 1 and 2) extending centrally and in a direction longitudinally of the machine somewhat below the level of the hereinbefore mentioned nail holding devices 220. Near its front and rear end said board 221 is suitably secured to the lower ends of pairs of vertical guide bars 222a 222b and 224a, 224b, respectively (Figs. 5B, 13 and 14), that slide in guide grooves formed by blocks 226, 227 and 228, 229. Said blocks are firmly mounted upon two vertically superposed rods 231 and 232 that extend longitudinally of the machine with their opposite ends mounted in the front and rear bars 233 and 234, respectively, of a rectangular frame 235 which rests upon the upper ends of the hereinbefore described side frames 67a and 67b of the machine (Fig. 1). At their upper ends the vertical bars 222a, 222b and 224a, 224b are suitably connected through spacer blocks 236 and 237, respectively, which rest upon the upper longitudinal rod 31 when the plate 221 is in its lowermost position, i. e., slightly below the level of the before mentioned nail holding devices 220. When a rising box bears with its lid against the plate 221 and lifts said plate with its guide bars sliding upwards, the right rear bar 224b (Figs. 13 and 14) comes with its upper end against the arm 240 of a normally closed switch 616 within a box 241 that is mounted upon a plate 242 which is secured to the aforementioned stationary block 228 on the rods 231 and 232. Said switch 616 is situated in the power circuit 608 of the hereinbefore mentioned anvil raising solenoid 609 (Fig. 34) and when opened by the described actuation of its arm 240 through guide bar 224b, said solenoid 609 is deenergized permitting the hydraulic control valve 500 to return, under the force of spring means (not shown), to its neutral position where further supply of hydraulic fluid into the cylinder 86 is cut off, while escape of the fluid previously supplied to the cylinder is blocked such that the piston 85 will cease to rise any further, but will retain the position that it reached at the moment the switch arm 240 was actuated (Fig. 14). The roller anvil 58 will, therefore, remain in the position in which the lid of the box placed thereon contacted the plate 221, i. e., at a horizontal level slightly below the lower end of the nail holding devices 220. As the upper end of the guide bar 224b actuates the switch 616, the upper end of the adjacent guide bar 224a comes against the control arm 244 of another switch 617 (Fig. 34) disposed within a box 245 which is likewise secured to the hereinbefore mentioned mounting plate 242 (Fig. 14). Said switch 617 is normally open and lies in the power circuit 618 of a relay 619 that is adapted upon energization to close the power circuit of a reversible electric motor 246 (Fig. 28) in such a manner as to enable said motor to move the hereinbefore mentioned box centering mechanism into operative position. In the particular embodiment of the present invention illustrated in the accompanying drawings the motor 246 may be mounted upon the horizontal flanges of a pair of longitudinally extending angle bars 247a and 247b (Fig. 5B) that are secured to transverse angle bars 249 and 250 (Fig. 13) affixed to brackets 251a, 251b and 252a, 252b that rise from the hereinbefore described rectangular frame 235 at the four corners thereof (Figs. 1 and 2).

*The box centering mechanism*

The box centering mechanism is composed of two symmetrically identical halves supported respectively from two oppositely moving carriages 255a and 255b that ride on and move along the opposite ends of the front and rear bars 233 and 234 of the hereinbefore described rectangular frame 235 (Figs. 3A, 3B, 4A, 5A and 5C). Since said carriages and most of the structures supported therefrom are of symmetrically identical construction and operate in an identical manner, it will suffice for an understanding of the machine to describe only one of said carriages because the description of one will logically apply to the other. Accordingly, in the accompanying drawings, the component parts of said carriages are identified by the same reference numerals but wherever it becomes necessary to distinguish between the left and the right carriages or components supported therefrom, they will be specially identified by the suffix letters a and b, respectively. Having specific reference to Fig. 4A, the left hand carriage 255a comprises front and rear rollers 259 and 260 that roll upon the upper edges of the front and rear bars 233 and 234, respectively, of the rectangular frame 235 and which are pivoted to mounting plates 261 and 262 that are adjustably supported from brackets 263 and 264 (Fig. 15). Said brackets in turn are bolted to vertical bars 265 and 266, respectively, (Fig. 16), that are rigidly connected by a longitudinally extending plank 267 and which carry adjustable lips 268 and 269, respectively, that slidably engage the lower edges of the front and rear bars 233 and 234. Said bars 265 and 266 are engaged for vertical sliding movement relative thereto by brackets 271 and 272, respectively. At their lower ends said brackets 271 and 272 carry and, in turn, are rigidly connected by, a pair of longitudinally extending transversely spaced bars 273 and 274. Suitable stop ledges 275 bolted to the vertical bars 265 and 266 determine the lowermost position to which the slide 276 formed by the brackets 271, 272 and the connecting twin bars 273 and 274 may descend (Fig. 16). Disposed intermediately of, and rigidly secured to said bars 273 and 274 adjacent the rear ends thereof, is a shelf 277 (Figs. 18 and 19), provided with two laterally directed arms 278 and 279 that carry a short horizontally positioned shaft 280 which extends longitudinally of the machine. Rotatably supported from said shaft is a board 281 that is normally maintained in a horizontal position adjacent to the bottom edges of the shelf 277 and the arms 278 and 279 by a latch member 282. Said latch member turns on a horizontally positioned stub shaft 283 that extends between and is mounted in a pair of ears 284 and 285 which project from shelf 277 in a direction inwardly of the machine, and a spring 286 suitably disposed between the upper end of said latch member 282 and said shelf 277 yieldably urges the latch member into a position wherein a notch 287 provided in its lower end engages the inwardly directed edge 288 of the board 281, thus holding it in the described position. Rigidly secured to the board 281 at the underside thereof is a bracket 290 in the shape of a prostrate U whose parallel bars 291 and 292 extend in a horizontal position toward the front end of the machine and rotatably support a vertical shaft 293 to which is secured a mounting block 294 (Fig. 20) that may be of square cross section. Attached to one side of said block is a plate 295 whose outwardly curved front end 296 extends in a direction toward the front end of the machine in the manner of a finger, and another plate 297 extending at right angles inwardly from said finger plate in the manner of a thumb. A spring 298 tensioned between the thumb plate 297 and the connecting bar 299 of the U-shaped bracket 290 yieldably holds said thumb plate 297, said block 294 and said finger plate 295 in an extreme counterclockwise position as viewed in Fig. 20, which is determined by an adjustable stop 300 that may be supported from the lower parallel bar 292 of the bracket 290 as shown. In said position, the curved front end 296 of the finger plate 295 is located closer to the plane of symmetry of the machine than its rear end and the end of the thumb plate 297 is located closer to the rear end of the machine than the shaft on which both said plates are mounted as best shown in Fig. 23.

To properly center a box positioned on the elevated anvil in a direction transversely of the machine, the opposed carriages 255a and 255b are moved inwardly against said box until their respective finger plates 295 engage and bear against the end walls thereof. For this purpose, the drive shaft 305 of the hereinbefore described electric motor 246 on top of the machine carries a clutch 306 which frictionally engages a sprocket 307 (Fig. 13) that is operatively connected by means of a sprocket chain 308 with another sprocket 309 which is firmly mounted upon a longitudinally extending shaft 310. Said shaft is suitably journaled in the front and rear bars 233 and 234 of the rectangular top frame 235 of the machine intermediately of the hereinbefore described mounting rods 231 and 232. Secured to the opposite ends of said shaft at points adjacent the inner surfaces of the frame bars 233 and 234, respectively, are pinions 311 and 312. At their upper sectors, said pinions mesh with racks 314 and 315, respectively, that extend to the left side of the machine, as viewed from the front end thereof (Fig. 5B) where they are bolted to the brackets 263a and 264a that form an integral part of the left-hand carriages 255a (Figs. 4a and 16), while the lower sectors of said pinions mesh with racks 316 and 317, respectively, that extend to the right side of the machine where they are bolted to the lips 268b and 269b which form an integral part of the right carriage 255b (Figs. 4a and 17). Whenever the motor 246 is set into motion by the closure of switch 617 as hereinbefore described, it turns the shaft 310 in clockwise direction as viewed in Fig. 5B, which pulls both the left and right hand carriages 255a and 255b, respectively, toward the plane symmetry of the machine.

Let it be assumed, for instance, that the anvil 58 carries a box B which is somewhat displaced from its proper center position toward the left side of the machine as illustrated in Fig. 23 after an initial elevation of the table. In such a case, the rounded end 296a of the left finger plate 295a will first engage the left hand end wall of the box and as a result thereof will swing outwardly, i. e., in clockwise direction due to the weight of the box, while its cooperating thumb plate 297a moves into engagement behind the rear wall of the box until the finger plate 295a extends parallel to the plane of symmetry of the machine and lies flat against the left end wall of the box, when the thumb plate 297a lies flat against the rear wall thereof as illustrated in Fig. 24. Further clockwise movement of the finger plate 295a is now positively prevented since the thumb plate 297a bears fully against the rear wall of the box and also due to an adjustable stop 319 that is held in an ear 320 which projects from the connecting bar 299 of the U-shaped bracket 290 (Fig. 20). Thus, upon further approach of the carriages 255a and 255b, the left hand finger plate 295a positively pushes the displaced box to the right while its co-acting thumb plate 297a maintains its rear wall in parallel alignment with the transverse perimeter of the machine until the right end wall of the box comes, and eventually bears fully, against the finger plate 295b of the opposite carriage 255b with said last mentioned finger plate assuming a position parallel to the extreme clockwise position of the left hand finger plate 295a as illustrated in Fig. 25. When this occurs the box is properly centered within the machine. Means are provided to suspend immediately further relative approach of the carriages 255a and 255b whenever the finger plates 295a and 295b have reached the defined positions in which they extend parallel to each other and parallel to the plane of symmetry of the machine. For this purpose, the control circuit 618 of the electric motor 246 includes two parallel paths containing two normally closed switches 620a and 620b (Fig. 34) that may be located in boxes 321 attached to the connecting bars 299 of the U-shaped brackets 290a and 290b at either side of the machine (Fig. 19). Each of said switches possesses an actuating arm 322 that is engaged and depressed by a camming member 323 secured to the block 294 which carries the finger and thumb plates 295, 297, whenever the finger plates reach the above described position parallel to the plane of symmetry of the machine. Thus, in the previously described instance of a box displaced to the left of its proper center position, the left hand finger plate 295a will first assume the defined position wherein its associated switch 620a will be thrown open, but the motor 246 will continue operation because its control relay 619 continues to receive power through the path established by the other switch 620b which is in parallel with switch 620a, as pointed out hereinbefore. The carriages will, therefore, continue to approach each other with the left finger plate 295a pushing the box physically to the right (Fig. 24) until the opposite end of the box is engaged by the opposite finger plate 295b and said box pushes said plate outwardly into a position in parallelism with the left hand finger plate 295a when the camming member 323 associated with the right hand finger plate opens the second switch 620b. Now both power paths to the control relay 619 of the motor 246 are interrupted, and said motor, being preferably of the self-braking type, suspends operation instantaneously. As a result thereof the carriages 255a and 255b come to a stand-still holding the box in properly centered position between their finger plates (Fig. 25).

The lid flushing mechanism

As may be seen from Figs. 3A and 3B, the described box centering mechanisms are suspended from their respective carriages 255a and 255b at such a level that the upper edges of their finger plates 295 are positioned somewhat higher than the box detecting center plate 221 that acts to suspend elevation of the roller table 58 whenever it is contacted by a box situated on the anvil. Hence, when the anvil 58 comes to a halt, the lid of the box situated on said anvil is usually still slightly below the level of the upper edges of the finger plates 295. Consequently, when the finger plates engage the end walls of the box and center the box in the manner described hereinbefore, they also engage the end edges of the box lid and flush the lid with the end walls of the box. To properly flush the lid boards of boxes of a materially greater width than the length of the finger plates 295, however, additional lid flushing means may be required that act upon the front portions of the lid ends. Fig. 4A shows four such lid flushing means 405 supported from the same twin bars 273 and 274 that support the box centering mechanism. Each of said lid flushing means comprises a flushing finger in the form of a vertical bar 406 (Fig. 26) that is pivotally supported upon a short horizontal shaft 407 held in the ends of a bracket 408 of hairpin shape (Fig. 27). Said bracket is clamped to the twin bars 273, 274 by means of a stud 409 whose threaded ends are engaged by clamping nuts 410 and 411 that press suitable bridge plates 412 and 413, respectively against the upper edges of the supporting twin bars 273, 274 and the lower edges of the hairpin bracket 408. Welded to the parallel legs of the bracket 408 adjacent the inwardly directed face of the flushing finger 406 is a vertically positioned elongated block 414, and means are provided to yieldably urge the flushing finger 406 against said block. For this purpose, a stud 415 anchored in the finger 406, such as by means of screw threads, protrudes through a slot 416 in the block 414 and carries a coil spring 417 that is compressed between the inwardly directed face of the block 414 and a pair of nuts 418 engaging the threaded end of said stud 415. It will be understood that upon loosening either the nut 410 or the nut 411, the position of the flushing fingers provided in the machine may individually be adjusted, both in longitudinal and in transverse direction. In adjusting the position of the flushing fingers, care should be taken that the inner surfaces of said fingers, when they are in their vertical position are accurately aligned with the inner surface of the finger plate 295 of the box centering mechanism supported from the same carriage when said finger plate is in its box centering position with its inner surface parallel to the plane of symmetry of the machine. Thus, as the carriages 255a and 255b close in upon a box situated upon the anvil 58 and the finger plates supported from said carriages contact its end walls and properly center said box, while their upper edges engage the box lid board at the rear end thereof, the flushing fingers 406 come against the end edges of the lid in front of the finger plates, and by the time the box is properly centered relatively to the machine, the lid is properly flushed with the end walls of the box.

The nail holding devices

The nail holding device 220 which are commonly known as nail chucks as mentioned hereinbefore, are supported from the same carriages 255a and 255b that mount the above described box centering and lid flushing mechanisms such that whenever said carriages come to a rest with the centering mechanism holding the box in properly centered position, each of said carriages holds a row of nail chucks above the respective side edge or the centered box.

In the exemplary embodiment of the invention as illustrated in the accompanying drawings, the actual nailing process is so arranged that the nails which are to secure the lid board or boards to the box frame, remain practically stationary in space while the box is raised relative to the nails with said nails positively restrained from yielding in an upward direction so that the nails will penetrate into and through the box lid and into the upper edges of the end walls of the rising box. Means are therefore provided in accordance with the invention that will automatically set the control valve 500 of the hydraulic system into a position wherein hydraulic liquid is pumped anew into the hydraulic cylinder 86 as soon as a box has been properly centered on the anvil 58 and the carriages 255a and 255b have come to a rest. For this purpose, the hereinbefore described actuating arms 322 (Fig. 19) are not only arranged to open the above mentioned switches 620a and 620b in the control circuit 618 of the carriage motor 246, they close at the same time two normally open series-connected switches 622a and 622b (Fig. 34) that are shunted across the hereinbefore described control switch 616 of the anvil raising solenoid 609. Hence, said solenoid is re-energized as soon as the box is properly centered on the table, though the switch 616 remains open due to the fact that the box detector plate 221 remains in raised position. Thus, as soon as the box centering and lid flushing operation is completed, and the carriage motor 246 has ceased to operate, the table 58 begins to rise again and presses the box with its lid against the nails held in the nail chucks 220.

Reverting now to the box on the partially elevated anvil 58, when the inwardly moving carriages 255a and 255b come to a halt, with the box properly centered upon the anvil 58 by operation of the finger and thumb plates 295, 297, and the lid board or boards properly flushed with the end walls of the box by the combined action of said finger plates and the flushing fingers 406, and while said carriages support the nail chucks 220 directly above the end edges of the lid, actuation of the switch arms 322a and 322b (Fig. 19) on the U-shaped brackets of the box centering mechanisms is effective to initiate a further rise of the anvil 58 as previously pointed out. As a result thereof, the box with its lid is forced against the charged nail chucks 220 and lifts said chucks, while means enter into effect that prevent the nails from yielding upwardly with the chucks. Said means have the form of rods 420 which slidably protrude into the upper ends of the vertical center channels in the chuck blocks. Said rods are suspended from a bridge member 421 bolted to the connecting plank 267 of each carriage for adjustment in a direction transversely as well as longitudinally of the machine. For this purpose, said bridge member 421 carries racks 422, one for each of the rods 420. Said racks 422 are formed by pairs of short transversely extending fillets 423 and 424 that may slide longitudinally of said bridge member. At its upper end, each of the rods 420 is mounted in a block 426 formed in the manner of a T that rests with the opposite ends of its cross bar 427 upon the fillets 423 and 424 of each rack and may therefore slide along said fillets to a limited extent in a direction transversely of the machine.

During the actual nailing operation, the flat upper surface of said cross bar 427 bears fully against the underside of the bridge member 421, and the rods 420 are therefore positively blocked from upward movement. Thus, when elevation of the anvil 58 forces the box against the nail chucks 220 and said chucks begin to yield in an upward direction, since their ultimate support is from the brackets 271 and 272 that slidably engage the vertical bars 265 and 266 of the carriage 255, the heads of the nails in the center channels of the chucks come soon against the bottom ends of the nail punch rods 420 which positively block any further upward movement of said nails. Thereafter, as the anvil 58 continues to rise and the chucks are lifted still further, the spring jaws of the chucks are forced apart by the nails and the nails contact and penetrate into and through the box lid and into the end walls of the box frame. In order that the described upward movement of the nail chucks may occur in a uniform manner, a longitudinally extending rod 430 is journaled in the two slide brackets 271 and 272 of the carriages 255 (Fig. 4A) and the outwardly projecting ends of said rod carry pinions 431 and 432 that mesh with vertical rack bars 433 and 434 which are adjustably bolted to the hereinbefore described vertical bars 265 and 266 of the carriages.

Finger plate-release mechanism

As soon as the nails enter the lid of the box, it is unnecessary that the clamps formed by the thumb and finger plates 295 and 297 of the box centering mechanism continue to engage the box and its lid, and means are therefore provided that effect release of said clamps as the box is forced against the nails in the chucks, though the carriages 255a and 255b remain in their inwardly displaced position in which they hold the rows of nail chucks in vertical alignment with the end edges of the lid and the box frame, respectively.

Having reference to the latch member 282 which holds the mounting board 281 of the box centering mechanisms flatly against the bottom edges of the shelf 277 and its arms 278 and 279 as previously explained (Fig. 18), the stub shaft 283 upon which said latch member is firmly mounted, extends rearwardly through its supporting ear 285, and firmly mounted upon its rearwardly projecting end is a short downwardly extending arm 437, the free end of which is provided with a roller 438 (Fig. 19). A camming ledge 440a (Fig. 21) is secured to the rack 434a on rear bar 266a of the carriage a limited distance above the roller 438 (when the vertically slidable assembly 276 of the carriage is in its lowermost position) and as the slidable assembly 276 of the carriage is lifted, when the nail chucks 220 encounter the rising box on the anvil 58, the roller 438 strikes against said ledge 440 which is effective to cam the arm 437 in clockwise direction as viewed in Fig. 21. This kicks the latching member 282 away from and out of engagement with the inner edge 288 of the mounting board 281, and said board, devoid of any support except for the shaft 280 upon which it is rotatably mounted and which is located above and outwardly displaced from the center of gravity of said board and the structure supported therefrom, swings in counterclockwise direction outwardly away from the adjacent end wall of the box into the position illustrated in Fig. 22 and as a result thereof, the finger and thumb plates 295 and 297 release the box. Thus, there is no danger that the clamps formed by the finger and thumb plates may accidentally hold the box in an elevated position once the nailing operation is completed and the anvil 58 begins to descend to its box discharging position. It should be noted, however, that the withdrawal of the finger and thumb plates from the walls of the box must be of such limited extent that it does not affect the position of the switch arms 322a and 322b as established by the above described box centering position of said finger and thumb plates. As a result thereof, the switches 620a and 620b in the control circuit 618 of the carriage motor remain open and the switches 622a and 622b in the power circuit of the anvil-raising solenoid 609 remain closed so that the hydraulic anvil may continue to rise while the carriages 255a and 255b stay in the position wherein they hold the nail chucks above the end edges of the box lid.

The hydraulic control system

As soon as the box on the rising anvil 58 encounters the nails in the chucks 220 and the heads of said nails engage the rods 420, the load placed upon the hydraulic cylinder 86 is sharply increased. In accordance with the present invention, the hydraulic system employed to operate the cylinder 86 is arranged to connect automatically a pressure booster 505 (Fig. 28) into the line between the pump 501 and the cylinder 86 as soon as the load upon the piston of said cylinder exceeds a certain upper limit, such as, for instance, 400 lbs. per square inch. Having reference to Figs. 28 and 29 to 33, the conduit 506 from the main control valve 500 of the hydraulic system leads through a secondary control valve 507. As diagrammatically indicated in Figs. 29, 30, 31 and 32, suitable means, such as a spring 508, hold said secondary valve 507 yieldably in a position wherein it establishes direct communication between the main valve 500 and the cylinder 86, whether or not liquid is actually passed through the conduit 506. In all of Figs. 29 through 33, the actual liquid flow between the components of the hydraulic system is indicated in full lines, while potential liquid flow is indicated in broken lines. Fig. 29 represents the previously described condition of the hydraulic system corresponding to the lowermost position of anvil 58 wherein the control valve 500 is in its neutral position returning the output of the continuously operating pump 501, which it receives through a suitable relief valve 509, to the reservoir 504. Fig. 30 represents the condition of the system wherein energization of solenoid 609 has set the control valve 500 to a position in which it delivers the output of the pump through the aforementioned secondary valve 507 directly to the cylinder 86 which is effective to raise the anvil 58, as also previously described. Fig. 31 represents the position which the system assumes when a rising box contacts the box detecting plate 221 and opens the control switch 616 which interrupts the power circuit 608 of the anvil raising solenoid 609, as previously described. Denergization of said solenoid causes return of the control valve 500 to its neutral position wherein it directs the output of the pump 501 to the reservoir 504 and blocks all liquid flow to and from the hydraulic cylinder, as indicated by the cross mark X in Fig. 31. As a result thereof, the anvil 58 remains in the partially raised position which it reached at the time the box placed thereon actuated the switch 616. However, as soon as the switches 622a and 622b close upon proper centering of the box on the partially elevated anvil 58, the solenoid 609 is re-energized and sets the control valve 500 again into its anvil raising position, and said anvil 58 begins to rise again.

The conduit 506 from the main control valve 500 to the hydraulic cylinder 86, however, is operatively connected to pressure responsive actuating means that is effective upon a predetermined pressure build-up in line 506 and cylinder 86, respectively, to set the secondary valve 507 to the position illustrated in Fig. 32, wherein it delivers the flow of liquid from the main valve 500 into the low pressure end 511 of the pressure booster 505, while blocking all flow of liquid between the main valve 500 and the cylinder 86. For this purpose a branch line 512 may be employed to apply the pressure developing in the line section 506a between the secondary valve 507 and the cylinder 86 to a pilot valve 510 adapted in response to a predetermined amount of pressure in said branch line to move into a position wherein it applies the pressure of the liquid supplied from main valve 500 to the secondary valve 507 in such a manner as to shift said secondary valve into the position illustrated in Fig. 32. In said position the output of the pump 501 is applied through a line 514 to the lower pressure side 511 of the pressure booster 505 which forces the liquid supplied into its high pressure end 515 when the system was in the setting illustrated in Fig. 30, at a slower rate and with a correspondingly increased pressure through a conduit 516 and through a part of the conduit section 506a into the hydraulic cylinder 86. As a result thereof, the hydraulic anvil 58 continues to rise at a slower rate and forces the nails with a correspondingly increased pressure through the lid and into the box frame.

Means to return anvil to lowered position

Means are provided in accordance with the invention to arrest further elevation of the anvil 58 and cause it to drop to its original lowermost position flush with the service platform 56 and the discharge conveyor 59 at the very instant that the nails have been driven fully into the box lid and the box frame, respectively. For this purpose, the L-shaped braces 401a and 402b mounted upon slidable brackets 271a and 272b at the front and rear ends respectively of the carriages 255a and 255b carry shelves 441a and 441b (Figs. 4A, 5C and 16) upon which are yieldably mounted upwardly projecting actuating studs 442a and 442b that are arranged to engage the actuating buttons 443a and 443b, of the previously described normally closed switches 615a and 615b (Fig. 34) in the holding circuit 612 of the master relay 606 and open said switches. The switches 615a and 615b are housed in switch castings 444a and 444b (Figs. 4A and 5C) which are secured to the vertically immovable connecting planks 267a and 267b of the carriages 255a and 255b in vertical alignment with the actuating studs 442a and 442b, respectively, at such an altitude that actuation of the switch buttons 443a and 443b occurs when the upper surface of the box lid reaches the level of the lower ends of the rods 420 which, as previously described, are likewise supported from the vertically immovable connecting planks of the carriages. Thus, as soon as the nails are driven fully into the lid and the box frame, respectively, the switches 615a and 615b are thrown open causing de-energization of the master relay 606 which permits the switch 607 in the power circuit 608 of the anvil raising solenoid 609 to open. In consequence thereof, the anvil raising solenoid 609 is de-energized permitting the control valve 500 to return to its neutral position wherein it delivers the output of the pump 501 into the reservoir 504. The anvil 58 therefore ceases to rise.

When the switch buttons 443a and 443b are actuated by the studs 442a and 442b to open the switches 615a and 615b, they close simultaneously another set of normally open switches 623a and 623b which lie in the power circuit 624 of another master relay 625 that operates upon energization to close a switch 626 in the power circuit 627 of another hydraulic control solenoid 628 (Fig. 34). Said solenoid 628 is effective upon activation to set the main control valve 500 of the hydraulic system into the condition illustrated in Fig. 33 wherein the output of the pump 501 continues to flow to the reservoir 504 and the line section 506b that formerly delivered fluid through the secondary valve 507 to the low pressure end 511 of the booster 505 is also connected to the reservoir. With the pressure upon the low pressure end 511 of the booster thus withdrawn and the liquid contained therein allowed to escape into the reservoir, the pressure in the conduit section 506a between the secondary valve 507 and the cylinder 86 drops rapidly, and as a result thereof the pressure responsive pilot valve 510 and the secondary valve 507 return under the force of spring means 517 and 508, respectively, to their normal positions wherein said secondary valve reconnects the conduit sections 560a and 506b while connecting the booster line 514 directly to a return line 519 that leads the liquid in the low pressure end of the booster into the reservoir 504 as indicated in Fig. 33. As a result the anvil 58 may drop under its own weight, driving the liquid contained in the cylinder 86 through the secondary valve 507 and the main valve 500 back into the reservoir 504.

To avoid that the anvil-lowering solenoid 628 may be energized while the anvil-raising solenoid 609 is still supplied with power, the power circuit 624 of the second master relay 625 contains a normally closed switch 629 that is held in open condition by the first master relay 606 as long as said last mentioned relay is energized. Thus, the master relay 625 of the anvil-lowering solenoid 628 will not receive power, although the switches 623a and 623b may be closed, until the master relay 606 of the anvil raising solenoid 609 has been de-energized, which, as previously explained, is immediately effective to interrupt the power circuit 618 of the table-raising solenoid 609.

When the hydraulic anvil 58 begins to drop, upon completion of its nailing stroke, the hereinbefore described actuating studs 442a and 442b supported from the slidable assemblies 276a and 276b of the carriages 255a and 255b, respectively, will release the switch operating buttons 443a and 443b permitting the switches 615a and 615b in the holding circuit 612 of the master relay 606 to close and the switches 623a and 623b in the power circuit 624 of the second master relay 625 to open. In spite of the closing of switches 615a and 615b the master relay 606 will remain inactive, however, because the holding switch 614 in holding circuit 612, which opened when the master relay 606 became inactive, will remain open; and to maintain the anvil-lowering solenoid 628 in energized condition in spite of the opening of switches 623a and 623b, said switches are shunted by a power path containing a normally open holding switch 630 that is closed as soon as, and remains closed as long as, the second master solenoid 625 is energized. The anvil will, therefore, continue to drop until it reaches its lowermost position flush with the discharge conveyor 59, when its frame 80 strikes against the hereinbefore described arm 218 of the switch 611 in the control circuit 602 of the roller motor 127 and closes said switch. Since the roller motor control switches 600a and 600b in said circuit 602 remain closed because depression of the stop arms 111a and 111b under the weight of the dropping box into the position illustrated in Fig. 11 remains without effect upon the switch arms 161a and 161b, as previously explained, the control circuit 602 of the roller motor is now closed, and the rollers begin to turn and eject the lidded box over the depressed stop arms on to the discharge conveyor 59. Depression of switch arm 218, however, is also arranged to open a normally closed switch 631 in the holding circuit 632 of the master solenoid 625 that controls the circuit of the anvil-lowering solenoid 628, causing immediate de-energization of said solenoid. This permits the main control valve 500 of the hydraulic system to return to its neutral position. As a result thereof further descent of the anvil 58 is arrested and the hydraulic system resumes the condition illustrated in Fig. 29, wherein it is ready for another operational cycle of the machine.

Means to return carriages to outward position

It remains to describe the switches in the electrical circuit arrangement of the machine which control return of the carriages to their initial positions adjacent the side frames of the machine. As the anvil 58 drops upon completion of a nailing stroke in the manner explained above, the hereinbefore described box detector plate 221 (Fig. 14) is permitted to drop until it reaches its lowermost position wherein its left rear bar 224a releases the actuating arm 244 of switch 617 in the control circuit 618 of the carriage motor 246. Switch 617 will, therefore, open and permanently interrupt the control circuit that causes operation of the carriage motor 246 in a manner effecting inward movement of the carriages. Arm 244, however, controls another switch 635 that is likewise located in the box 245 and which is situated in another control circuit 636 that contains a relay 637 adapted upon energization to initiate rotation of the carriage motor 246 in a direction opposite to the direction of rotation as established by energization of the relay 619 in control circuit 618. Said switch 635 is normally closed, and the arm 244 is arranged to hold it open as long as said arm itself is contacted by the hereinbefore mentioned rear bar 224a of the box detector plate 221. Thus, when the box detector plate reaches its lowermost position during descent of the anvil 58, the switch 635 will close and in consequence thereof the relay 637 is energized starting the motor 246 in a direction effective to return the carriages to their initial positions adjacent the side frames of the machine.

As soon as the carriages reach their outermost positions, actuating studs 428a and 428b yieldably mounted in, and outwardly projecting from, the L-shaped brackets 402a and 401b at the rear and front ends respectively of the carriages 255a and 255b (Figs. 5A and 17), engage the actuating buttons of normally closed switches 638a and 638b housed in boxes 429a and 429b that are suitably secured to the brackets 252a and 251b of the machine frame, and throw said switches open. Said switches are situated in the hereinbefore mentioned power circuit 636 of the reverse control relay 637 of the carriage motor 246. Thus, said circuit 636 is interrupted and the carriage motor comes to a halt, therefore, as soon as one of the carriages reaches its outermost position.

As the carriages 255a and 255b move apart from each other, means enter into operation that re-establish the effective position of the box centering finger and thumb plates 295a, 297a and 295b, 297b. Having reference to Figs. 21 and 22, each of the U-shaped brackets 290 comprised in the machine carries an outwardly directed bolt or stud 470 that may be adjustably mounted in a lug 471 welded to, and projecting downwardly from, the lower horizontal leg 292 of said brackets. When the carriages 255a and 255b approach their outermost position adjacent the side frames of the machine, said studs come against vertically disposed mounting plates 472 (Fig. 17) that are supported from the adjacent side frames of the machine. Hence, as the carriages complete their outward movement, the U-shaped brackets 290 swing upon their shafts 280 from the position shown in Fig. 22 into the position shown in Fig. 21 until the inner edges 288 of their supporting boards 281 are re-engaged by the spring-urged latch members 282, when the clamps formed by their finger and thumb plates are again in a condition to properly grip the rear corners of a box positioned upon the anvil 58.

With the carriages in their outermost position and the box centering mechanism supported therefrom returned to its effective condition, and with the anvil 58 returned to the level of the service platform 56, the machine of the invention is ready for another operational cycle.

The power supply to the various control circuits described above may be controlled by a suitable master switch indicated at 640 in Fig. 34, and control relays 641 and 642 for the nail pan actuating motor 361 and the hydraulic pump motor 502, respectively, may be connected directly across the main lines 643 and 644 of the electrical circuit arrangement shown in Fig. 34 so that said motors may commence operation as soon as the machine is readied for practical performance by closure of the master switch 640.

From the above description of the machine, it will be apparent that the machine adapts itself automatically to boxes of varying depth within the limits of its capacity. A box of greater depth will merely contact the box detecting plate 221 sooner than a box of lesser depth and consequently cause temporary halt of the anvil 58 at a lower level than in the case of a shallower box. It will also be readily apparent that the machine of the invention is capable of handling boxes of any length up to a maximum length determined by the actual transverse width of the machine, without the necessity for any manual adjustment. In case of a box of shorter length the carriages 255a and 255b will simply move closer together than in the case of a box of greater length before they come to a halt as a result of the described actuation of the switches 620a and 620b in response to the final position which the finger and thumb plates 295a, 295b and 297a, 297b assume during the box centering operation, and from then on all operations proceed in the same way for all boxes no matter what their length may be. Furthermore, it will be apparent that the box lidding machine of the invention, as described hereinbefore, is capable of handling boxes of varying width (in a direction longitudinally of the machine), for when a properly squared and centered box is raised against the nail chucks 220, it will have as many nails forced through its lid and into its end walls as it contacts nail chucks, while the chucks beyond its width will eject the nails contained therein, because all the chucks supported from the twin bars 273, 274 are raised in unison whenever any one of them is raised by contact with the rising box. In practice, there is, of course, an upper limit for the width of a box that a particular box lidding machine may handle which is set by the actual length of the two rows of nailing mechanisms comprised in the machine. Below said limit, however, the machine may handle boxes of any width without any special adjustment on the part of the attending personnel, and if a box is shorter in width than the length of the nail chuck rows at either side of the machine, the only difference in the operation of the machine is that a greater or lesser number of nail chucks at the front end of the rows will idly eject their nails during the actual nailing phase in the operation of the machine.

*Operation*

At the beginning of each operating cycle, the box-supporting anvil is in its lowered position, the stop levers 111a and 111b are in the forwardly inclined position shown in Fig. 9, the rollers 74a and 74b of the anvil 58 are being rotated, the carriages 255a and 255b are in the outer position adjacent the side frames of the machine, a nail is disposed in the lower end of each chuck 220, and the pump 501 of the hydraulic system is in operation.

A box (Fig. 1) with a lid loosely disposed thereon is delivered by the conveyor 50 to the work platform 56 where the operator roughly centers and squares the box in the machine and pushes it onto the power driven rollers 74a and 74b. As the box moves toward the rear of the machine, it contacts the inclined stop levers 111a and 111b and moves them to upright position (compare Figs. 9 and 10). As the levers move to upright position, they deenergize the circuit of the motor 127 which drives the rollers 74a and 74b, and hence said rollers suspend rotation. Movement of the levers 111a and 111b to upright position also completes part of the circuit of the solenoid 609 which controls the hydraulic valve 500. The solenoid 609 is arranged upon energization to move the hydraulic valve 500 from a neutral position to an operative position wherein fluid is directed from the continuously operating pump 501 to the hydraulic cylinder 86 which controls the elevation of the anvil 58. To complete the power circuit of the solenoid 609, the operator depresses the foot switch 610 thereby causing the initial raising of the anvil 58 (Fig. 3).

As the box moves upwardly, the lid of the box engages and lifts the plate 221. This causes the bar 224b to actuate the switch 616 which is effective to deenergize the solenoid 609 permitting the hydraulic control valve 500 to return to neutral position (Fig. 31). Thus, the anvil comes to rest in the elevated position. Upward movement of the plate 221 also causes the bar 224a to close the normally open switch 617 which energizes the relay 619. Upon energization said relay closes the power circuit of the reversible electric motor 246 permitting said motor to move the laterally positioned carriages 255a and 255b inwardly of the machine. This brings the centering plates 295a and 295b into contact with the box to center it transversely of the machine and moves the flushing fingers 406 into engagement with the end surfaces of the lid to move the lid into a position flush with the end walls of the box. Inward movement of the cardiages also brings the nail chucks 220 into position above the side edges of the lid. When the carriages 255a and 255b reach a position wherein a box is centered relative to the machine, arms 322a and 322b carried by the carriages are actuated to open switches 620a and 620b in the control circuit of the carriage motor 246 to stop the inward movement of the carriages. Actuation of arms 322a and 322b also closes normally open switches 622a and 622b to effect reenergization of the solenoid 609 to once more start the upward movement of the anvil 58.

As the anvil 58 is moved upward, the lid is pressed against the nails which are held in the nail chucks 220 on the carriages 255a and 255b, causing the nails to be driven through the lid into the box. When the nail chucks contact the lid of the box, the centering plate-retaining latches 282 are released causing the centering plates to swing away from the box. When the load placed on the hydraulic cylinder 86 during the nailing operation reaches a predetermined value, the hydraulic booster 505 is automatically connected into the system to aid in the driving of the nails (Fig. 32).

When the nails are fully driven into the box lid and into the box frame, upward movement of the anvil 58 is arrested by deenergization of the solenoid 609 which is effected by the studs 442 (Fig. 4B) that are supported from the rising carriages and which open the normally closed switches 615 in the holding circuit 612 of the master relay 606. Upon deenergization the solenoid 609 permits the hydraulic control valve 500 to return to its neutral position and the anvil 58 therefore ceases to rise. The studs 442 also act to cause energization of the solenoid 628. This is effective to set the control valve 500 into condition wherein the output of the pump 501 and the booster 505 is directed to the reservoir 504. With the pressure in the hydraulic system relieved, the anvil 58 drops under its own weight to its initial position bringing the box down onto the inclined stop levers 111a and 111b and finally onto the power driven rollers 74a and 74b. Depression of said stop levers under the weight of the descending box energizes the control circuit of the roller motor and the rollers begin to turn and eject the lidded box from the machine onto the discharge conveyor 59.

As the anvil 58 drops upon completion of a nailing stroke, the box detector plate 221 is permitted to move downwardly, automatically energizing a circuit which causes the carriage motor 246 to operate in a reverse direction to move the carriages outwardly to their initial lateral position adjacent the side frames of the machine. As soon as the carriages reach their outermost positions, the reverse rotation of the carriage motor 246 is interrupted and the carriages stop in their outermost positions. As the carriages complete their outward movement, the nail picks are actuated to feed another nail into each chuck and the spring-urged latches 282 are moved into retaining engagement with the centering plates 295 to hold them in position to properly grip the rear corners of the next box positioned on the anvil 58.

With the carriages in their outermost position and the box centering mechanism supported therefrom returned to its effective condition, and with the anvil 58 returned to the level of the service platform 56, the machine is ready for another operational cycle.

While we have described the present invention with the aid of a particular embodiment thereof, it will be understood that we do not wish to be limited to the constructional details illustrated and described which may be departed from without departing from scope and spirit of the present invention.

We claim:

1. Arrangement for orienting boxes and the like comprising a conveyor table operable to urge a box supported thereon in a predetermined path thereacross, a pair of stop arms projecting at transversely spaced points into the path of a box moving across said conveyor table, each arm being adapted to individually preclude further progress of that portion of a box urged thereagainst, and means operative in response to a box being urged against both of said stop arms for interrupting operation of said conveyor table.

2. Arrangement for orienting boxes and the like comprising a box supporting table including a plurality of juxtaposed rollers, means for rotating said rollers to urge a box supported on said table in a predetermined path thereacross, a pair of stop arms projecting into the path of a box moving across said table at points on a line parallel to the rotative axes of said rollers, each arm being adapted to individually preclude further progress of that portion of a box urged thereagainst, and means operative in response to a box being urged against both of said stop arms for interrupting rotation of said rollers.

3. Arrangement for orienting boxes and the like comprising a conveyor table operable to urge yieldably a box supported thereon in a predetermined path thereacross, a pair of arms projecting into the box path at transversely spaced points and being individually movable in a direction longitudinally thereof, stop means for each of said arms to limit the movement thereof in response to the urgency of a portion of a box moved against one of said arms by said conveyor table, and means operative in response to the movement of both of said arms toward said stop means to interrupt operation of said conveyor table.

4. Arrangement for orienting boxes and the like comprising a conveyor table operable to urge a box supported thereon in a predetermined path thereacross, a pair of arms independently mounted at transversely spaced points of the box path for rotation about a transverse horizontal axis below the upper surface of said table, spring means yieldably holding said arms in a rotary position wherein they project at an angle above said table in a direction opposite to the direction of movement of a box on said table, stop means for each of said arms to limit the movement thereof in response to the urgency of a portion of a box moved against one of said arms by said conveyor table to positions wherein said arms remain above the upper surface of said table, and means operative in response to the movement of both of said arms toward said stop means to interrupt operation of said conveyor table, said arms being arranged to yield in an opposite direction below the conveyor table.

5. Arrangement for centering boxes or the like comprising a horizontal table, a pair of pivotally mounted box centering members supported above the table, a pair of carriages respectively mounting said centering members, said carriages being in symmetrically spaced relation with respect to a predetermined vertical centering plane through said table and adapted for movement at right angles relative thereto, and means for laterally moving said carriages toward one another in a direction at right angles to the centering plane, whereby said centering members will engage the end walls of a box situated on the table.

6. Arrangement for centering boxes and the like upon a table with respect to a predetermined vertical centering plane therethrough which comprises a pair of plates supported for rotation about vertical axes above the table in symmetrically spaced relation with respect to the centering plane for movement at right angles relative thereto, each plate being adapted for disposition in parallelism with said centering plane, and means for moving said plates toward one another in a direction at right angles to the centering plane so as to engage the end walls of the box.

7. Arrangement for centering boxes and the like upon a table with respect to a predetermined vertical centering plane therethrough which comprises means for orienting a box on the table with its end walls disposed substantially in parallelism with the centering plane, a pair of plates supported for rotation above the table in symmetrically-spaced relation with respect to the centering plane and for movement at right angles relative thereto, each plate being adapted for disposition in parallelism with the centering plane upon movement into engagement with the end walls of an oriented box on said table, and means for laterally moving said plates toward one another while maintaining said symmetrically spaced relation thereof, so as to engage the end walls of the box and position the same in symmetrical and parallel relation with respect to the centering plane.

8. Arrangement for centering boxes and the like upon a table with respect to a predetermined vertical plane therethrough which comprises means for orienting a box on the table with its end wall disposed substantially in parallelism with the centering plane, a pair of plates supported above the table in symmetrically spaced relation with respect to the centering plane for movement at right angles relative thereto, each plate being adapted for disposition in parallelism with the centering plane upon movement into engagement with the end walls of an oriented box on said table, means for moving said plates simultaneously at equal rates toward one another so as to engage the end walls of the box, and means operative upon disposition of both said plates in parallelism with the center plane to arrest further relative approach of said plates.

9. Arrangement for centering boxes and the like upon a table with respect to a predetermined vertical centering plane therethrough which comprises a pair of plates supported for pivotal movement about vertical axes in symmetrical relation to the centering plane and for bodily movement at right angles relative to the centering plane, means urging said plates into pivotal disposition with their free ends directed angularly inwards toward the centering plane, means for moving said plates toward one another so as to engage the end walls of the box whereby said plates are pivoted into parallelism with the centering plane, and means operative in response to disposition of both of said plates in parallelism with the centering plane to arrest further inward movement of said plates.

10. Arrangement for centering boxes and the like upon a table with respect to a predetermined vertical centering plane therethrough which comprises means for orienting a box on the table with its end walls disposed substantially in parallelism with the centering plane, a pair of plates supported for pivotal movement about vertical axes in symmetrical relation to the centering plane and for bodily movement at right angles relative to the centering plane, means urging said plates into a pivotal disposition with their free ends directed angularly inwards toward the centering plane, means for moving said plates simultaneously at equal rates toward one another so as to engage the end walls of the box whereby said plates are pivoted into parallelism with the centering plane, and means operative in response to disposition of both of said plates into parallelism with the centering plane to arrest further inward movement of said plates whereby the box is disposed with its end walls in symmetrical and parallel relation with respect to the centering plane.

11. Arrangement according to claim 10 comprising second plates extending rectangularly inwards from said centering plates and arranged to pivot into flat engagement with the rear wall of the box as said centering plates come into flat engagement with the end walls of the box.

12. In an arrangement for positioning a box and the like, a table supporting the box, a pair of plates supported by said table, means pivotally mounting one of said plates about a vertical axis above the table for right angular movement relative to the other plate, and means for laterally moving said one plate toward said other plate so as to engage the end walls of the box for positioning the same.

13. An arrangement for positioning a box as claimed in claim 12 wherein said one plate comprises angular members for engaging adjoining walls of the box for positioning the same.

References Cited in the file of this patent

UNITED STATES PATENTS

| | | |
|---|---|---|
| 1,115,758 | Whitton | Nov. 3, 1914 |
| 1,355,488 | McKenney | Oct. 12, 1920 |
| 1,586,544 | White | June 1, 1926 |
| 2,641,371 | Webster | June 9, 1953 |
| 2,723,393 | Verrinder et al. | Nov. 15, 1955 |
| 2,724,482 | Francisci | Nov. 22, 1955 |